US010432369B2

(12) United States Patent
Montreuil et al.

(10) Patent No.: US 10,432,369 B2
(45) Date of Patent: Oct. 1, 2019

(54) MULTIPLE USER (MU) SHORT FEEDBACK RESPONSE IN WIRELESS COMMUNICATIONS

(71) Applicant: Avago Technologies General IP (Singapore) Pte. Ltd., Singapore (SG)

(72) Inventors: Leo Montreuil, Atlanta, GA (US); Ron Porat, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/879,375

(22) Filed: Jan. 24, 2018

(65) Prior Publication Data

US 2018/0167181 A1 Jun. 14, 2018

Related U.S. Application Data

(63) Continuation-in-part of application No. 15/426,875, filed on Feb. 7, 2017.
(Continued)

(51) Int. Cl.
*H04L 5/00* (2006.01)
*H04W 72/04* (2009.01)
(Continued)

(52) U.S. Cl.
CPC .......... *H04L 5/0037* (2013.01); *H04L 5/0007* (2013.01); *H04L 5/0092* (2013.01);
(Continued)

(58) Field of Classification Search
CPC ... H04L 5/0037; H04L 5/0053; H04L 5/0007; H04L 5/0092; H04L 5/0023; H04W 72/0446; H04W 72/048; H04W 72/0413
(Continued)

(56) References Cited

U.S. PATENT DOCUMENTS 9,838,232 B2 * 12/2017 Chen .................... H04L 27/2613
2012/0057471 A1 * 3/2012 Amini .................... H04W 24/04
370/242

(Continued)

*Primary Examiner* — Phong La
(74) *Attorney, Agent, or Firm* — Garlick & Markison; Randy W. Lacasse

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and processing circuitry, among other possible circuitries, components, elements, etc. to support communications with other WDEV(s) and to generate and process signals for such communications. The WDEV supports first communications with another WDEV to determine an agreed-upon orthogonal frequency division multiple access (OFDMA) resource unit (RU) and agreed-upon OFDMA sub-carriers to be used by the other WDEV to provide predetermined response(s). The WDEV then transmits a question to the WDEV and processes the plurality of agreed-upon OFDMA sub-carriers within the OFDMA RU to determine whether energy therein indicates a response of the one or more predetermined responses to the question being received from the other WDEV in accordance with second communications.

17 Claims, 11 Drawing Sheets

Related U.S. Application Data

(60) Provisional application No. 62/461,640, filed on Feb. 21, 2017, provisional application No. 62/464,305, filed on Feb. 27, 2017, provisional application No. 62/511,802, filed on May 26, 2017, provisional application No. 62/305,461, filed on Mar. 8, 2016, provisional application No. 62/333,650, filed on May 9, 2016, provisional application No. 62/409,754, filed on Oct. 18, 2016, provisional application No. 62/452,189, filed on Jan. 30, 2017.

(51) Int. Cl.
*H04B 7/0417* (2017.01)
*H04B 7/0452* (2017.01)

(52) U.S. Cl.
CPC ..... *H04W 72/048* (2013.01); *H04W 72/0413* (2013.01); *H04B 7/0417* (2013.01); *H04B 7/0452* (2013.01); *H04L 5/0023* (2013.01)

(58) Field of Classification Search
USPC .......................................................... 370/329
See application file for complete search history.

(56) References Cited

U.S. PATENT DOCUMENTS

| | | | |
|---|---|---|---|
| 2014/0126417 A1* | 5/2014 | Kang | H04W 8/005 370/254 |
| 2016/0143026 A1* | 5/2016 | Seok | H04W 72/0413 370/329 |
| 2016/0330714 A1* | 11/2016 | Hedayat | H04W 72/1289 |
| 2017/0070914 A1* | 3/2017 | Chun | H04W 4/70 |
| 2017/0104563 A1* | 4/2017 | Lee | H04L 5/0044 |
| 2017/0188390 A1* | 6/2017 | Adachi | H04L 5/0007 |
| 2017/0325239 A1* | 11/2017 | Xing | H04W 4/06 |
| 2018/0110076 A1* | 4/2018 | Ko | H04L 5/00 |
| 2018/0139635 A1* | 5/2018 | Oteri | H04W 74/006 |

* cited by examiner

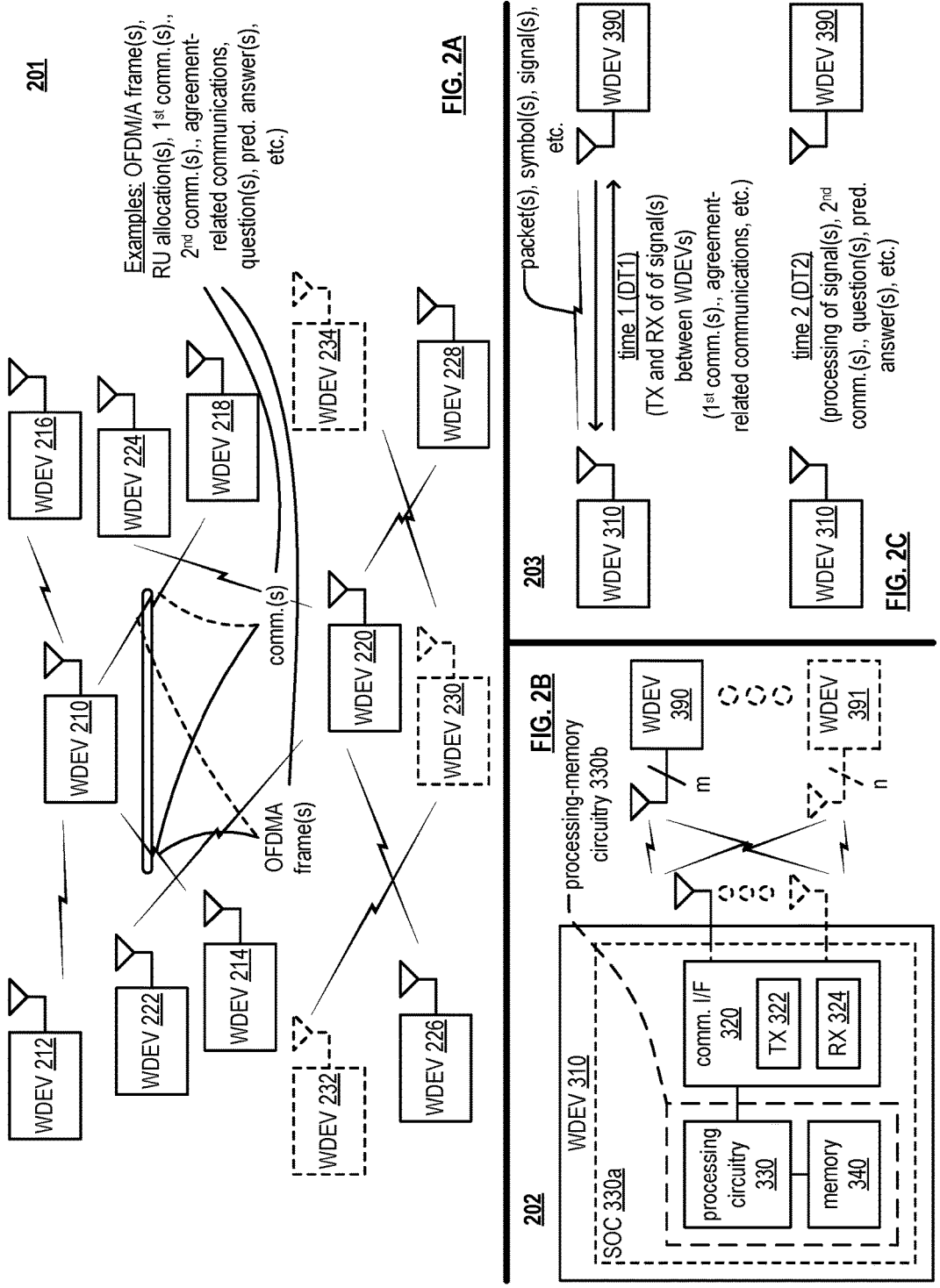

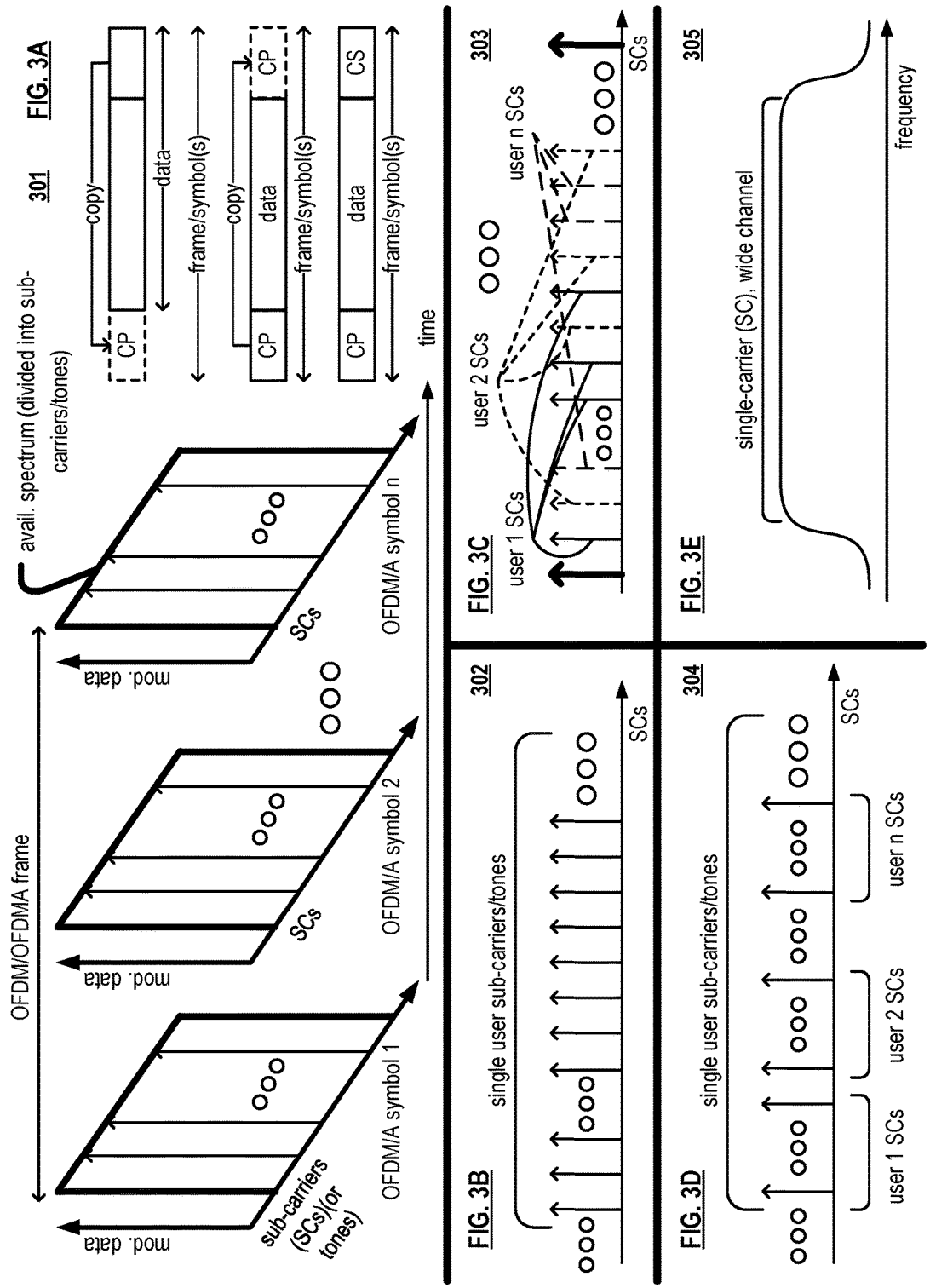

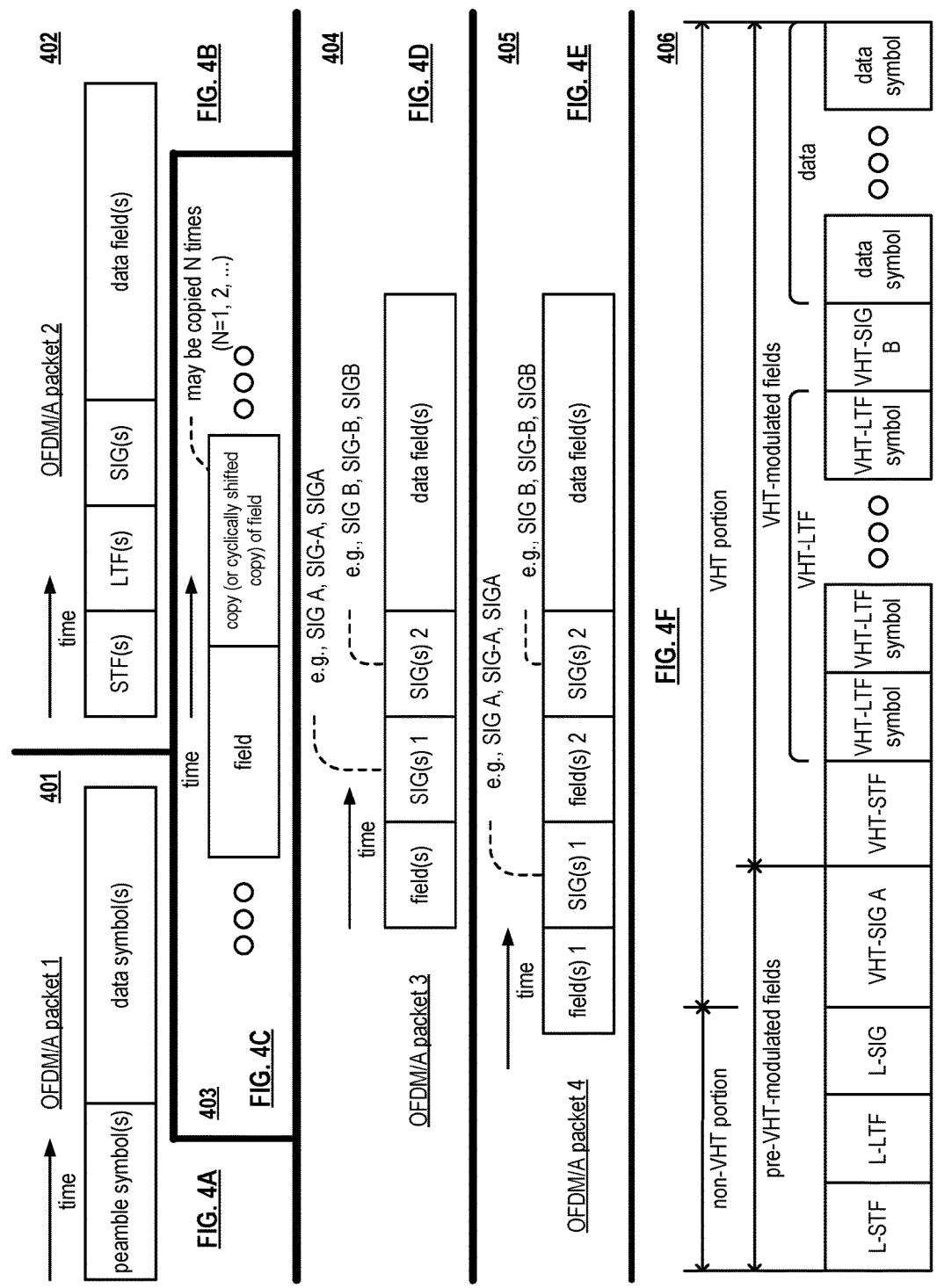

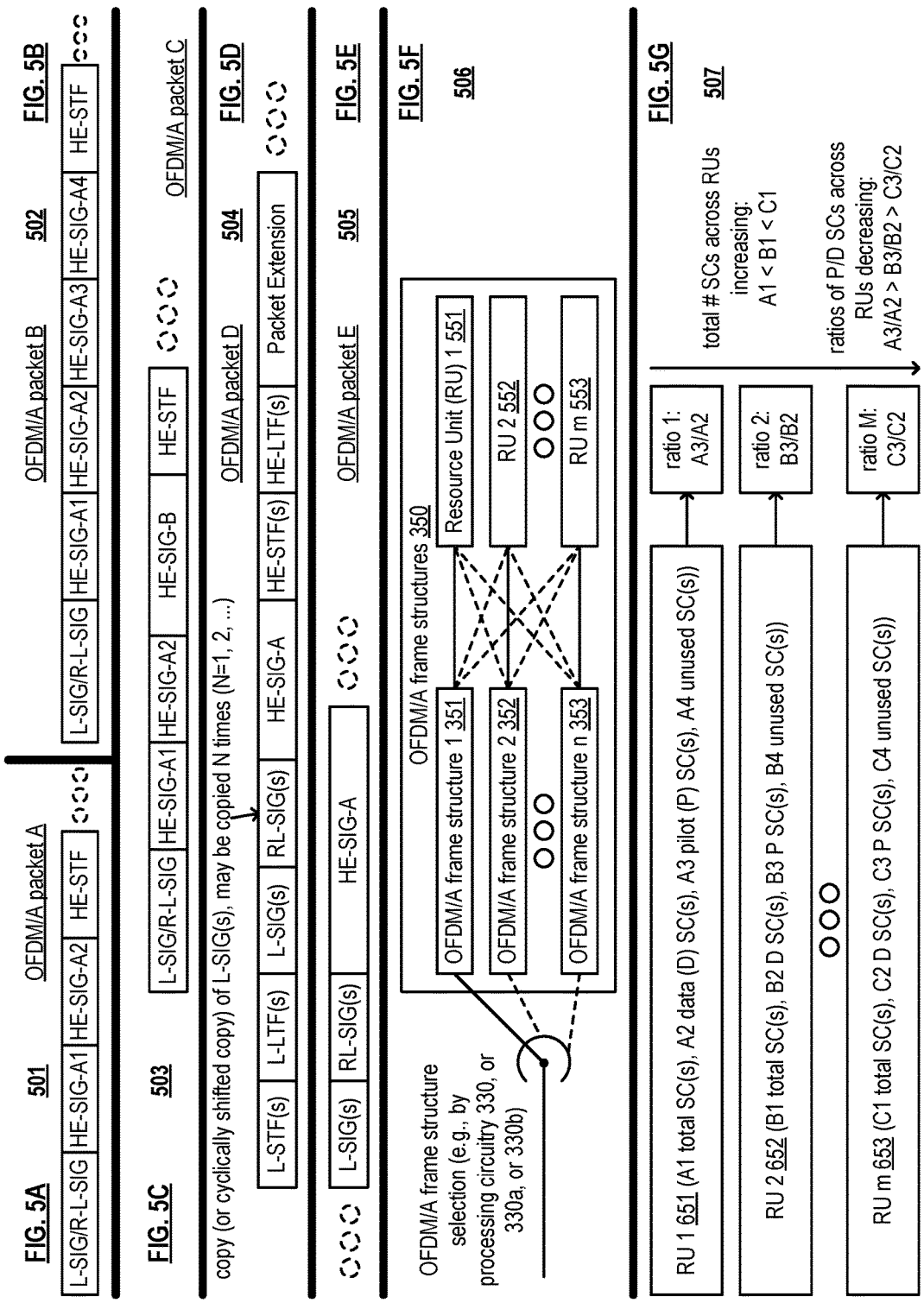

| HE-STF | S#1 | S#2 | S#3 |
|---|---|---|---|
| | 1 | 10 | 19 |
| | 2 | 11 | 20 |
| | 3 | 12 | 21 |
| | 4 | 13 | *22* |
| | *5* | 14 | 23 |
| | 6 | 15 | 24 |
| | 7 | 16 | *25* |
| | *8* | 17 | |
| | 9 | *18* | |

→ time

- using n bit symbols (e.g., 3 symbols of n bits)
- Yes from STA ID: 5, 8, 18, 22, and 25
- No from remaining STA IDs ▨ *y*
☒ x

| HE-STF | S#1 | S#2 | S#3 | |
|---|---|---|---|---|
| | RB1 | RB10 | RB19 | RU26#1 |
| | RB2 | RB11 | RB20 | RU26#2 |
| | RB3 | RB12 | RB21 | RU26#3 |
| | RB4 | RB13 | *RB22* | RU26#4 |
| | *RB5* | *RB14* | RB23 | RU26#5 |
| | RB6 | RB15 | RB24 | RU26#6 |
| | RB7 | RB16 | *RB25* | RU26#7 |
| | *RB8* | RB17 | *RB26* | RU26#8 |
| | RB9 | *RB18* | *RB27* | RU26#9 |

→ time

- using n bit symbols (e.g., 3 symbols of n bits)
- Yes from STA ID: 5, 8, 10, 14, 22, and 25
- No from remaining STA IDs
- No response from STA ID 18

- example of detection method

|  | A | B | A | B | A | B | A | B | A | B | A | B | A | B | A | B | A | B | A | B | A | B | A | B | A | B |
|---|---|---|---|---|---|---|---|---|---|---|---|---|---|---|---|---|---|---|---|---|---|---|---|---|---|---|
| yes | +1 | 0 | +1 | 0 | +1 | 0 | +1 | 0 | +1 | 0 | +1 | 0 | +1 | 0 | +1 | 0 | +1 | 0 | +1 | 0 | +1 | 0 | +1 | 0 | +1 | 0 |
| no | 0 | +1 | 0 | -1 | 0 | +1 | 0 | -1 | 0 | +1 | 0 | -1 | 0 | +1 | 0 | -1 | 0 | +1 | 0 | -1 | 0 | +1 | 0 | -1 | 0 | +1 |
| no response | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

→ frequency (e.g., 26 sub-carriers)

FIG. 10

Sub-carrier/tone set indices for each 20 MHz: $I_{ULf}$

1000

| P-Matrix 1x1 | P-Matrix 2x2 | P-Matrix 4x4 | 2 bit or 1 bit high power | | | |
|---|---|---|---|---|---|---|
| | | | 1 bit | | | |
| Tone sets | Tone sets | Tone sets | b0 = 1 | b0 = 0 | b1 = 1 | b1 = 0 |
| 1 | 1,2 | 1,2,3,4 | -113,-77,-41,6,42,78 | -112,-76,-40,7,43,79 | -95,-59,-23,24,60,96 | -94,-58,-22,25,61,97 |
| 2 | :  | : | -111,-75,-39,8,44,80 | -110,-74,-38,9,45,81 | -93,-57,-21,26,62,98 | -92,-56,-20,27,63,99 |
| 3 | : | : | -109,-73,-37,10,46,82 | -108,-72,-36,11,47,83 | -91,-55,-19,28,64,100 | -90,-54,-18,29,65,101 |
| 4 | : | : | -107,-71,-35,12,48,84 | -106,-70,-34,13,49,85 | -89,-53,-17,30,66,102 | -88,-52,-16,31,67,103 |
| 5 | : | : | -105,-69,-33,14,50,86 | -104,-68,-32,15,51,87 | -87,-51,-15,32,68,104 | -86,-50,-14,33,69,105 |
| 6 | : | : | -103,-67,-31,16,52,88 | -102,-66,-30,17,53,89 | -85,-49,-13,34,70,106 | -84,-48,-12,35,71,107 |
| 7 | : | : | -101,-65,-29,18,54,90 | -100,-64,-28,19,55,91 | -83,-47,-11,36,72,108 | -82,-46,-10,37,73,109 |
| 8 | : | : | -99,-63,-27,20,56,92 | -98,-62,-26,21,57,93 | -81,-45,-9,38,74,110 | -80,-44,-8,39,75,111 |
| 9 | 17,18 | 33,34,35,36 | -97,-61,-25,22,58,94 | -96,-60,-24,23,59,95 | -79,-43,-7,40,76,112 | -78,-42,-6,41,77,113 |
| 10 | 19,20 | 37,38,39,40 | -95,-59,-23,24,60,96 | -94,-58,-22,25,61,97 | | |
| 11 | : | : | -93,-57,-21,26,62,98 | -92,-56,-20,27,63,99 | | |
| 12 | : | : | -91,-55,-19,28,64,100 | -90,-54,-18,29,65,101 | | |
| 13 | : | : | -89,-53,-17,30,66,102 | -88,-52,-16,31,67,103 | | |
| 14 | : | : | -87,-51,-15,32,68,104 | -86,-50,-14,33,69,105 | | |
| 15 | : | : | -85,-49,-13,34,70,106 | -84,-48,-12,35,71,107 | | |
| 16 | : | : | -83,-47,-11,36,72,108 | -82,-46,-10,37,73,109 | | |
| 17 | : | : | -81,-45,-9,38,74,110 | -80,-44,-8,39,75,111 | | |
| 18 | 35,36 | 69,70,71,72 | -79,-43,-7,40,76,112 | -78,-42,-6,41,77,113 | | |

MULTIPLE USER (MU) SHORT FEEDBACK RESPONSE IN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. § 119(e) to U.S. Provisional Application No. 62/461,640, entitled "Multiple user (MU) short feedback response in wireless communications," filed Feb. 21, 2017; U.S. Provisional Application No. 62/464,305, entitled "Multiple user (MU) short feedback response in wireless communications," filed Feb. 27, 2017; U.S. Provisional Application No. 62/511,802, entitled "Multiple user (MU) short feedback response in wireless communications," filed May 26, 2017; all of which are hereby incorporated herein by reference in their entirety and made part of the present U.S. Utility patent application for all purposes.

Continuation-In-Part (CIP) Priority Claim

The present U.S. Utility patent application also claims priority pursuant to 35 U.S.C. § 120, as a continuation-in-part (CIP), to U.S. Utility patent application Ser. No. 15/426,875, entitled "Multiple user (MU) short feedback response in wireless communications," filed Feb. 7, 2017, pending, which claims priority pursuant to 35 U.S.C. § 119(e) to U.S. Provisional Application No. 62/305,461, entitled "Multiple user (MU) short feedback response in wireless communications," filed Mar. 8, 2016; U.S. Provisional Application No. 62/333,650, entitled "Multiple user (MU) short feedback response in wireless communications," filed May 9, 2016; U.S. Provisional Application No. 62/409,754, entitled "Multiple user (MU) short feedback response in wireless communications," filed Oct. 18, 2016; and U.S. Provisional Application No. 62/452,189, entitled "Multiple user (MU) short feedback response in wireless communications," filed Jan. 30, 2017; all of which are hereby incorporated herein by reference in their entirety and made part of the present U.S. Utility patent application for all purposes.

BACKGROUND

Technical Field

The present disclosure relates generally to communication systems; and, more particularly, to communications to and from wireless communication devices within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Various communications in wireless communications are performed for various purposes. Regardless of the reason for such communications, such communications consume available bandwidth and occupy the communication medium. The prior art does not provide acceptably effective means by which the communication medium can be used most effectively while maximizing access to all wireless communication devices within such wireless communication systems.

In addition, within prior art communication systems, channel estimation, channel characterization, and/or other operations are performed to provide full and accurate understanding of a wireless communication channel to allow for effective communications. There continues to exist significant room in the prior art for improvement in the manner by which communications may be effectively made.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of at least one portion of an OFDM/A packet.

FIG. 4B is a diagram illustrating another example of at least one portion of an OFDM/A packet of a second type.

FIG. 4C is a diagram illustrating an example of at least one portion of an OFDM/A packet of another type.

FIG. 4D is a diagram illustrating another example of at least one portion of an OFDM/A packet of a third type.

FIG. 4E is a diagram illustrating another example of at least one portion of an OFDM/A packet of a fourth type.

FIG. 4F is a diagram illustrating another example of at least one portion of an OFDM/A packet.

FIG. 5A is a diagram illustrating another example of at least one portion of an OFDM/A packet.

FIG. 5B is a diagram illustrating another example of at least one portion of an OFDM/A packet.

FIG. 5C is a diagram illustrating another example of at least one portion of an OFDM/A packet.

FIG. 5D is a diagram illustrating another example of at least one portion of an OFDM/A packet.

FIG. 5E is a diagram illustrating another example of at least one portion of an OFDM/A packet.

FIG. 5F is a diagram illustrating an example of selection among different OFDM/A frame structures for use in communications between wireless communication devices and specifically showing OFDM/A frame structures corresponding to one or more resource units (RUs).

FIG. 5G is a diagram illustrating an example of various types of different resource units (RUs).

FIG. 6A is a diagram illustrating another example of various types of different RUs.

FIG. 6B is a diagram illustrating another example of various types of different RUs.

FIG. 6C is a diagram illustrating an example of various types of communication protocol specified physical layer (PHY) fast Fourier transform (FFT) sizes.

FIG. 6D is a diagram illustrating an example of different channel bandwidths and relationship there between.

FIG. 7A is a diagram illustrating an example of OFDMA/TDMA feedback.

FIG. 7B is a diagram illustrating an example of a simulation of operation.

FIG. 7C is a diagram illustrating another example of OFDMA/TDMA feedback

FIG. 10 is a diagram illustrating an example of tones (sub-carriers) user per wireless communication device (e.g., user, STA, etc.) in a 20 MHz bandwidth.

DETAILED DESCRIPTION

Figure 1:
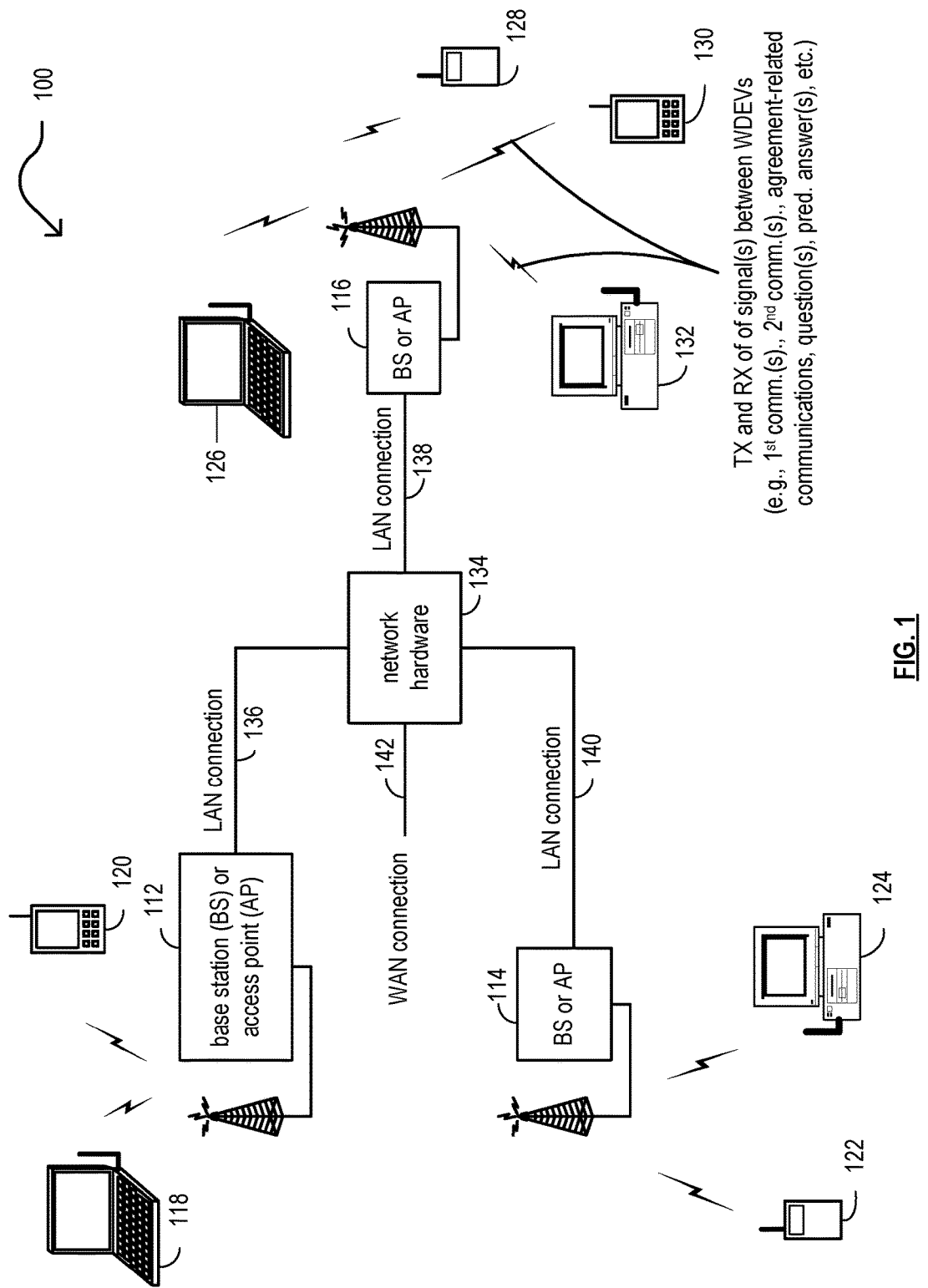
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include processing circuitry and/or a communication interface to support communications with any other of the wireless communication devices 118-132 and BSs or APs 112-116. In an example of operation, processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such processing circuitry includes all capability, functionality, and/or circuitry, etc. to perform such operations as described herein. In some other examples, such a communication interface includes all capability, functionality, and/or circuitry, etc. to perform such operations as described herein. In even other examples, such processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes processing circuitry to support communications with one or more of the other wireless communication devices (e.g., any other of the WDEVs 118-132 and BSs or APs 112-116). For example, such processing circuitry is configured to perform both processing operations as well as communication interface related functionality. Such processing circuitry may be implemented as a single integrated circuit, a system on a chip, etc.

In another example of implementation and operation, a wireless communication device (e.g., any one of the WDEVs 118-132 and BSs or APs 112-116) includes processing circuitry and a communication interface configured to support communications with one or more of the other wireless communication devices (e.g., any other of the WDEVs 118-132 and BSs or APs 112-116).

In an example of operation and implementation, BS/AP 116 supports communications with WDEV 130. For example, the BS/AP 116 is configured to support first communications with WDEV 130 to determine an agreed-upon orthogonal frequency division multiple access (OFDMA) resource unit (RU) of a plurality of OFDMA RUs and a plurality of agreed-upon OFDMA sub-carriers within the OFDMA RU to be used by the WDEV 130 to provide one or more predetermined responses to the BS/AP 116 in accordance with second communications. The BASE STATION (BS)/AP 116 is also configured to transmit a question to the in accordance with the second communications, and process the plurality of agreed-upon OFDMA sub-carriers within the OFDMA RU to determine whether energy therein indicates a response of the one or more predetermined responses to the question being received from the in accordance with the second communications in accordance with the second communications.

In another example, BS/AP 116 supports communications with WDEVs 130, 132. The For example, the BS/AP 116 is configured to support third communications with WDEV 130 and WDEV 132 to determine another agreed-upon OFDMA RU of the plurality of OFDMA RUs and a first other plurality of agreed-upon OFDMA sub-carriers within the another OFDMA RU to be used by the WDEV 130 to provide the one or more predetermined responses to the wireless communication device in accordance with fourth communications and a second other plurality of agreed-upon OFDMA sub-carriers within the another OFDMA RU to be used by the WDEV 132 to provide the one or more predetermined responses to the BS/AP 116 in accordance with the fourth communications. Then, in accordance with the fourth communications, the BS/AP 116 is configured to transmit an OFDMA frame that includes a first other question to the WDEV 130 and a second other question to the WDEV 132. The BS/AP 116 is also configured to process the first other plurality of agreed-upon OFDMA sub-carriers within the another OFDMA RU to determine whether energy therein indicates a first other response of the one or more predetermined responses to the first other question from the WDEV 130 and to process the second other plurality of agreed-upon OFDMA sub-carriers within the another OFDMA RU to determine whether energy therein indicates a second other response of the one or more predetermined responses to the second other question from the WDEV 132. In some examples, the first other response of the one or more predetermined responses to the first other question from the WDEV 130 and the second other response of the one or more predetermined responses to the second other question from the WDEV 132 are included in another OFDMA frame transmitted from the WDEVs 130, 132 to the BS/AP 116 in response to the prior OFDMA frame that includes the first other question to the WDEV 130 and the second other question to the WDEV 132 that is transmitted from the BS/AP 116.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116.

Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation and implementation, WDEV 210 supports communications with WDEV 218. For example, the WDEV 210 is configured to support first communications with WDEV 218 to determine an agreed-upon orthogonal frequency division multiple access (OFDMA) resource unit (RU) of a plurality of OFDMA RUs and a plurality of agreed-upon OFDMA sub-carriers within the OFDMA RU to be used by the WDEV 218 to provide one or more predetermined responses to the WDEV 210 in accordance with second communications. The WDEV 210 is also configured to transmit a question to the in accordance with the second communications, and process the plurality of agreed-upon OFDMA sub-carriers within the OFDMA RU to determine whether energy therein indicates a response of the one or more predetermined responses to the question being received from the in accordance with the second communications in accordance with the second communications.

In another example, WDEV 210 supports communications with WDEVs 214, 218. The For example, the WDEV 210 is configured to support third communications with WDEV 218 and WDEV 214 to determine another agreed-upon OFDMA RU of the plurality of OFDMA RUs and a first other plurality of agreed-upon OFDMA sub-carriers within the another OFDMA RU to be used by the WDEV 218 to provide the one or more predetermined responses to the wireless communication device in accordance with fourth communications and a second other plurality of agreed-upon OFDMA sub-carriers within the another OFDMA RU to be used by the WDEV 214 to provide the one or more predetermined responses to the WDEV 210 in accordance with the fourth communications. Then, in accordance with the fourth communications, the WDEV 210 is configured to transmit an OFDMA frame that includes a first other question to the WDEV 218 and a second other question to the WDEV 214. The WDEV 210 is also configured to process the first other plurality of agreed-upon OFDMA sub-carriers within the another OFDMA RU to determine whether energy therein indicates a first other response of the one or more predetermined responses to the first other question from the WDEV 218 and to process the second other plurality of agreed-upon OFDMA sub-carriers within the another OFDMA RU to determine whether energy therein indicates a second other response of the one or more predetermined responses to the second other question from the WDEV 214. In some examples, the first other response of the one or more predetermined responses to the first other question from the WDEV 218 and the second other response of the one or more predetermined responses to the second other question from the WDEV 214 are included in another OFDMA frame transmitted from the WDEVs 214, 218 to the WDEV 210 in response to the prior OFDMA frame that includes the first other question to the WDEV 218 and the second other question to the WDEV 214 that is transmitted from the WDEV 210.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, a system-on-a-chip (SOC) 330a may be implemented to include the processing circuitry 330, the communication interface 320 (including the TX 322 and/or RX 324 thereof), and the memory 340 (e.g., SOC 330a being a multi-functional, multi-module integrated circuit that includes multiple components therein). Considering another example, processing-memory circuitry 330b may be implemented to include functionality similar to both the processing circuitry 330 and the memory 340 yet the communication interface 320 is a separate circuitry (e.g., processing-memory circuitry 330b is a single integrated circuit that performs functionality of processing circuitry and a memory and is coupled to and also interacts with the communication interface 320).

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes SOC 330a configured to perform various operations. In even other examples, the device 310 includes processing-memory circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media).

Any of the signals generated and transmitted and/or received and processed by the device 310 may be communicated via any of these types of communication systems.

In an example of operation and implementation, WDEV 310 is configured to support first communications with a WDEV 390 and a WDEV 391 to determine an agreed-upon orthogonal frequency division multiple access (OFDMA) resource unit (RU) of a plurality of OFDMA RUs and a first plurality of agreed-upon OFDMA sub-carriers within the OFDMA RU to be used by the WDEV 390 to provide one or more predetermined responses to the WDEV 310 and a second plurality of agreed-upon OFDMA sub-carriers within the OFDMA RU to be used by the WDEV 391 to provide the one or more predetermined responses to the WDEV 310 in accordance with second communications.

Then, in accordance with the second communications, the WDEV 310 is configured to transmit an OFDMA frame that includes a first question to the WDEV 390 and a second question to the WDEV 391. The WDEV 310 is also configured to process the first plurality of agreed-upon OFDMA sub-carriers within the OFDMA RU to determine whether energy therein indicates a first response of the one or more predetermined responses to the first question from the WDEV 390. The WDEV 310 is also configured to process the second plurality of agreed-upon OFDMA sub-carriers within the OFDMA RU to determine whether energy therein indicates a second response of the one or more predetermined responses to the second question from the WDEV 391.

In some examples, the first other response of the one or more predetermined responses to the first other question from the WDEV 390 and the second other response of the one or more predetermined responses to the second other question from the WDEV 391 are included in another OFDMA frame transmitted from the WDEVs 391, 390 to the WDEV 310 in response to the prior OFDMA frame that includes the first other question to the WDEV 390 and the second other question to the WDEV 391 that is transmitted from the WDEV 310.

FIG. 2C is a diagram illustrating another example 203 of communication between wireless communication devices. In an example of operation and implementation, at or during a first time (e.g., time 1 ($\Delta T1$)), the WDEV 310 transmits signal(s) to WDEV 390, and/or the WDEV 390 transmits another/other signal(s) to WDEV 310. At or during a second time (e.g., time 2 ($\Delta T2$)), the WDEV 310 processes signal(s) received from WDEV 390, and/or the WDEV 390 processes signal(s) received from WDEV 310.

In some examples, the signal(s) communicated between WDEV 310 and WDEV 390 may include or be based on communications (e.g., frame exchanges) to come to an agreement on agree-upon parameters (e.g., OFDMA RU(s), OFDMA sub-carriers, etc.) predetermined question(s), pre-determined answer(s), and/or other information for use in supporting any desired type of communications between WDEV 310 and WDEV 390.

In an example of operation and implementation, at or during a first time (e.g., time 1 ($\Delta T1$)), the WDEV 310 is configured to support first communications with WDEV 390 to determine an agreed-upon orthogonal frequency division multiple access (OFDMA) resource unit (RU) of a plurality of OFDMA RUs and a plurality of agreed-upon OFDMA sub-carriers within the OFDMA RU to be used by the WDEV 390 to provide one or more predetermined responses to the WDEV 310 in accordance with second communications.

Then, at or during a second time (e.g., time 2 ($\Delta T2$)), in accordance with the second communications, the WDEV 310 is configured to transmit a question to the WDEV 390 and to process the plurality of agreed-upon OFDMA sub-carriers within the OFDMA RU to determine whether energy therein indicates a response of the one or more predetermined responses to the question being received from the WDEV 390.

In some examples, the OFDMA RU of the plurality of OFDMA RUs includes 26 OFDMA sub-carriers. More details are also provided below and with respect to other diagrams regarding various embodiments, examples, etc. by which and into which a communication channel, OFDMA sub-carriers, etc. may be arranged and divided. Also, in certain specific examples, the plurality of agreed-upon OFDMA sub-carriers within the OFDMA RU that includes 26 OFDMA sub-carriers includes a first set of 6 OFDMA sub-carriers and a second set of 6 OFDMA sub-carriers. For example, the OFDMA RU that includes 26 OFDMA sub-carriers may include 4 respective sets of 6 OFDMA sub-carriers each in one example.

In other specific examples, the plurality of agreed-upon OFDMA sub-carriers include respective sets of 6 OFDMA sub-carriers that are set across a 20 MHz communication channel.

In an example, the OFDMA RU of the plurality of OFDMA RUs is based on a 20 MHz communication channel. For example, the 20 MHz communication channel may include 4 respective sets of 6 OFDMA sub-carriers each in one example. Note that the respective sets of 6 OFDMA sub-carriers may be adjacent to one another or the respective OFDMA sub-carriers therein may be interspersed across the 20 MHz communication channel. For example, the respective OFDMA sub-carrier sets may be adjacent in a similar manner as the sets of sub-carriers are assigned to different respective users/wireless communication devices such as with respect to FIG. 3D. Alternatively, the respective sets of 6 OFDMA sub-carriers may be interspersed in a similar manner as the sets of sub-carriers are assigned to different respective users/wireless communication devices such as with respect to FIG. 3C. In even other examples, a combination of adjacent and interspersed sets of OFDMA sub-carriers may be used such that at least one set of OFDMA sub-carriers includes adjacently located OFDMA sub-carriers and at least one set of OFDMA sub-carriers includes interspersed-located OFDMA sub-carriers.

In general, any particular size of N OFDMA sub-carriers (e.g., N, where N is a positive integer greater than or equal to 1) may be used for the respective sets of N OFDMA sub-carriers within any particular desired size RU (e.g., RU of size 26, 52, 106, 242, 484, 996, and/or other size RU), or alternatively, within any particular desired size of communication channel (e.g., 20 MHz, 40 MHz, 80 MHz, 160 MHz, etc., and/or other size communication channel).

Note also that different respective sizes of A, B, C, etc. OFDMA sub-carriers (e.g., where each of A, B, C, etc. is a positive integer greater than or equal to 1) may be used for the respective sets of OFDMA sub-carriers within any particular desired size RU (e.g., RU of size 26, 52, 106, 242, 484, 996, and/or other size RU), or alternatively, within any particular desired size of communication channel (e.g., 20 MHz, 40 MHz, 80 MHz, 160 MHz, etc., and/or other size communication channel). For example, in some alternative examples, the number of OFDMA sub-carriers within each set need not be the same exact number. Considering an example, a first set includes A OFDMA sub-carriers and a second set of B OFDMA sub-carriers (e.g., where each of A and B is a different respective positive integer greater than or equal to 1).

The one or more predetermined responses may include any of a variety of types of responses (e.g., yes or no such as in accordance with a 1-bit response, a set or not set response such as in accordance with a 1-bit response, etc., and/or different types of responses including those that may include multi-bit responses in some examples).

For example, in one particular example, first energy within the first set of 6 OFDMA sub-carriers being greater than second energy within the second set of 6 OFDMA sub-carriers based on a scaling factor corresponds to a first predetermined response (e.g., yes, set) of the one or more predetermined responses to the question being received from the WDEV 390, and the second energy within the second set of 6 OFDMA sub-carriers being greater than the first energy within the first set of 6 OFDMA sub-carriers based on the scaling factor corresponds to a second predetermined response (e.g., no, not set) of the one or more predetermined responses to the question being received from the WDEV 390.

Also, in some examples, a situation in which no response has been received by the WDEV 310 may be based on a determination that the first energy within the first set of 6 OFDMA sub-carriers not being greater than the second energy within the second set of 6 OFDMA sub-carriers based on the scaling factor and the second energy within the second set of 6 OFDMA sub-carriers not being greater than the first energy within the first set of 6 OFDMA sub-carriers based on the scaling factor. This situation may be used to determine that no response to the question is being received from the WDEV 390. Any of a variety of subsequent operations may be performed based on a situation where no response to the question has been received from the WDEV 390 including the WDEV 310 re-transmitting the question to the WDEV 390 in a subsequent attempt to receive a response there from.

In addition, in some examples, the OFDMA RU of the plurality of OFDMA RUs includes 26 OFDMA sub-carriers, and the plurality of agreed-upon OFDMA sub-carriers within the OFDMA RU that includes 26 OFDMA sub-carriers includes a first set of 6 OFDMA sub-carriers and a second set of 6 OFDMA sub-carriers. Again, alternatively, in other examples, the plurality of agreed-upon OFDMA sub-carriers within a communication channel of a particular size (e.g., 20 MHz) includes a first set of 6 OFDMA sub-carriers and a second set of 6 OFDMA sub-carriers such that the 6 OFDMA sub-carriers are spread across the communication channel of the particular size (e.g., 20 MHz).

Note that fewer than all of the second set of 6 OFDMA sub-carriers in the first set of 6 OFDMA sub-carriers and/or a second set of 6 OFDMA sub-carriers may be used to make a determination of whether a predetermined response (e.g., yes, no, set, not set, or not received) of the one or more predetermined responses to the question being received from the WDEV 390.

For example, in one particular example, first energy within fewer than all of the first set of 6 OFDMA sub-carriers (e.g., considering 5 or some smaller number of OFDMA sub-carriers such as excluding the OFDMA sub-carrier having the highest energy among the first set of 6 OFDMA sub-carriers) is greater than second energy within fewer than all of the second set of 6 OFDMA sub-carriers (e.g., considering 5 or some smaller number of OFDMA sub-carriers such as excluding the OFDMA sub-carrier having the highest energy among the first set of 6 OFDMA sub-carriers) based on a scaling factor and corresponds to a first predetermined response of the one or more predetermined responses to the question being received from the WDEV 390 (e.g., in accordance with comparing the sum of energy and/or power at complementary sets of sub-carriers/tones). Also, the second energy within the fewer than all of the second set of 6 OFDMA sub-carriers being greater than the first energy within the fewer than all of the first set of 6 OFDMA sub-carriers based on the scaling factor corresponds to a second predetermined response of the one or more predetermined responses to the question being received from the WDEV 390 (e.g., in accordance with comparing the sum of energy and/or power at complementary sets of sub-carriers/tones).

From certain perspectives, using fewer than all of the OFDMA sub-carriers within a particular set of OFDMA sub-carriers may be performed for various reasons including to improve the robustness of a receiver wireless communication device to discrete spurious tones/sub-carriers interference. For example, these spurs can be in the communication channel and/or a wireless communication device (e.g., a transmitter such as with respect to a STA transmitter and/or an access point (AP) receiver implementation). Note that these discrete spurs may be common in certain examples and may prevent detection of the feedback response at low level if not mitigated. Note that using fewer than all of the OFDMA sub-carriers within a set of OFDMA sub-carriers includes a technique to remove the discrete spurs from the decision process and introduce minimal degradation in presence of various deleteriously effects (e.g., additive white Gaussian noise (AWGN)).

Also, in some specific examples, the first predetermined response of the one or more predetermined responses includes a first 1-bit predetermined response, and the second predetermined response of the one or more predetermined responses includes a second 1-bit predetermined response.

In other examples, more than 2 sets of OFDMA sub-carriers (e.g., 4 sets of OFDMA sub-carriers are employed to provide for the first predetermined response of the one or more predetermined responses including a first 2-bit predetermined response, and the second predetermined response of the one or more predetermined responses including a second 2-bit predetermined response.

In another example of implementation and operation, the WDEV 310 includes both processing circuitry to perform many of the operations described above and also includes a communication interface, coupled to the processing circuitry, that are configured in combination to support communications within a satellite communication system, a wireless communication system, a wired communication system, a fiber-optic communication system, and/or a mobile communication system. For example, certain operations may be performed by only the processing circuitry, other certain operations may be performed by only the communication interface, and even some other certain operations may be performed by both the processing circuitry and the communication interface.

In addition, in some examples, the first communications between a WDEV 310 and one or more other WDEVs 390, 391 to agree upon one or more parameters by which subsequent communications are to be made also involves selecting one or more P-matrices by which communications from the one or more other WDEVs 390, 391 are to be based. For example, when transmitting response(s) to the WDEV 310, the one or more other WDEVs 390, 391 may be configured to use at least one P-matrix.

In an example of operation and implementation, at least one P-matrix to be used by at least one of the WDEVs 390, 391 when transmitting at least one of the feedback responses to the WDEV 310, at least one number of OFDMA symbols to be used by the at least one of the WDEVs 390, 391 when transmitting the at least one of the feedback responses to the WDEV 310, and/or at least one of a number of bits to be included by the at least one of the WDEVs 390, 391 when transmitting the at least one of the feedback responses to the WDEV 310.

With respect to an example that allows WDEV 310 to decide the number of bits per response, the robustness (Nx) and the spreading number of spatial streams, Nss (e.g., as may be achieved using an appropriately selected P-matrix). For example, of WDEV 310 sends to WDEVs 390, 391 the following three parameters (e.g., for agreed-upon parameters) for the null data packet (NDP) short feedback response:
1. Nb=1, 2, 3 or 4 (number of bits in response)
2. Nx=1, 2, or 4 (number of symbols per 1 bit (alt. 1b) to transmit, control the robustness)
3. Nss=1, 2, or 4 (P-matrix size and number of OFDMA symbols); where $$Nb \times Nx <= Nss$$

Examples in 20 MHz may be as follows:
A. 9 STAs with 1b response, maximum efficiency (less robustness): Nb=1, Nx=1, Nss=1 (one OFDMA symbol)
B. 9 STAs with 1b response, minimum efficiency (more robustness): Nb=1, Nx=4, Nss=1 (four OFDMA symbols)
C. 9 STAs with 2 bit (alt. 2b) response, medium efficiency (moderate robustness): Nb=2, Nx=2, Nss=4 (four OFDMA symbols)
D. 18 STAs with 1b response, maximum efficiency (less robustness): Nb=1, Nx=1, Nss=2 (two OFDMA symbols)
E. 36 STAs with 1b response, maximum efficiency (less robustness): Nb=1, Nx=1, Nss=4 (four OFDMA symbols)

In the examples above, {D, E} are like a first Option #1 that uses a P-matrix for spreading (e.g., to add more users while keeping a same number of bits) and {C} is like an Option #2 (where a user is assigned a given set of sub-carriers, and a P-matrix is used to get more possible states, such as 1×1 P-matrix for 1 bit, 2×2 P-matrix for 2 bits, and 4×4 P-matrix for 3 or 4 bits, such as to add more bits per user).

With this novel scheme, NDP feedback response from a WDEV (WDEV 390 or WDEV 391) could be set to be always on a common set of 6 tones and to be within a single 26 tones RU, or, alternatively, within a communication channel of a particular size (e.g., 20 MHz). Response could range from 1 to 4 bits. In this novel scheme, the WDEV 310 decides the maximum Nss supported. For a given Nss, implementation is the same at AP whatever the multiples states are originating one or multiple STAs. The WDEV 310 can balance between robustness and maximum number of users.

An example of a P-matrix is an orthogonal matrix (e.g., $P_{2 \times 2}$=[top row [1 1], bottom row [1−1]]). Different respective P-matrices of different sizes (e.g., 4×4, 6×6, 8×8, etc.) can be formed. For example, a 4×4 P-matrix can be formed such as by a combination of a 2×2 P-matrix and using conjugation methods. In some particular examples, a P-matrix may generally be viewed as being a complex square matrix with every principal minor greater than zero (0) (e.g., with a specific example including the $P_{2 \times 2}$ described above). In wireless communications, the use of a P-matrix can provide for spreading of respective sub-carriers to allow for more states across a given set of sub-carriers. For example, the use of a P-matrix can be used to perform spreading of signal to provide for allow for more bits in signaling that may be used for more users and/or more bits per user. As some examples, a 1×1 P-matrix would not provide for additional bits (e.g., result in just 1 bit), but a 2×2 P-matrix would provide for additional bits (e.g., result in 2 bits), and a 4×4 P-matrix would also provide for additional bits (e.g., result in 3 or 4 bits, as may be desired in different examples).

This disclosure presents, among other things, a novel signaling mechanism, scheme, protocol, approach, recommended practice, etc. for the multiple users (MUs) (e.g., multiusers) feedback such a trigger frame (e.g., such as a AP trigger frame from an AP, an AP-operative STA, such as the WDEV 310).

In one examples, feedback responses from the WDEVs 390-391 can include: Positive (YES), Negative (NO) or No response.

This disclosure shows various novel examples of short uplink (UL) feedback that may be used to improve efficiency and reduce latency.

In an example of implementation and operation including query and feedback, WDEV 310 generates and transmits an AP query downlink (DL) to WDEV 390 to determine if WDEV 390 has any information, data, etc. to be transmitted uplink (UL) to the WDEV 310 (e.g., WDEV 310 asks WDEV 390, the question: "Do you have something to send?"). The WDEV 390 responds with "YES" or "NO" by appropriate signaling based on the agree-upon parameters. In some instances, while the WDEV 390 transmits a response to WDEV 310, such a response may not be successfully received by the WDEV 310.

Various examples operate herein using novel signaling for the multiusers feedback (e.g., from WDEVs 390-391 to WDEV 310) from a trigger frame (e.g., feedback from WDEVs 390-391 to WDEV 310 such as in response to an AP trigger frame from WDEV 310). Examples of feedback responses: Positive (YES), Negative (NO).

Feedback Signaling:

In an example of implementation and operation, a response for one STA occupies one 26 tone RU [RU26], or, alternatively, within a communication channel of a particular size (e.g., 20 MHz) (e.g., see FIG. 5A-6D for examples of various sized resource units (RUs), channel bandwidths, etc.).

Such feedback signals can be implemented using 3 levels (e.g., −1, +1, and 0).

Considering an example where peak to average power ratio (PAPR) is 2.84 dB, 13 tones are BPSK modulated with a Barker sequence at +3 dB, such that 13 tones are nulls. Compensation of +3 dB may be used for 13 nulls tones per RU26. Note that this is not a power boosting. Generally speaking, this presents an alternative example of sets of OFDMA sub-carriers of a different size (e.g., including 13 OFDMA sub-carriers) in comparison to other examples herein that include sets of OFDMA sub-carriers of another different size (e.g., including 6 OFDMA sub-carriers). Generally speaking, this is another example of the implementation of using two sets of N OFDMA sub-carriers, where N is a positive integer greater than or equal to 1. Some examples include sets of 13 OFDMA sub-carriers (e.g., two 13 OFDMA sub-carrier sets that are adjacent within one RU26, and/or a communication channel of approximately 2 MHz), other examples include sets of 6 OFDMA sub-carriers, and other examples include sets of N OFDMA sub-carriers (e.g., where N is a positive integer greater than or equal to 1).

In some examples, the respective sets of OFDMA sub-carriers (e.g., 6 OFDMA sub-carriers) are spread apparat for various reasons that may include one or more of adding frequency diversity, providing for more robustness to narrowband interference, preventing false radar detection in dynamic frequency selection (DFS) band, and/or allowing higher power (some countries have specific power spectral density limitations in addition to total transmit power).

Non-nulls and nulls tones are interleaved in frequency to minimize impairments from channel.

Examples of 3 possible responses on a 26 tones RU may be as follows:

Yes=[+1, 0, +1, 0, +1, 0, +1, 0, +1, 0, −1, 0, −1, 0, +1, 0, +1, 0, −1, 0, +1, 0, −1, 0, +1, 0]*sqrt(2);

No=[0, +1, 0, +1, 0, +1, 0, +1, 0, +1, 0, −1, 0, −1, 0, +1, 0, +1, 0, −1, 0, +1, 0, −1, 0, +1]*sqrt(2);

No response=[0, 0, 0, 0, 0, 0, 0, 0, 0, 0, 0, 0, 0, 0, 0, 0, 0, 0, 0, 0, 0, 0, 0, 0, 0, 0];

Note that channel estimation need not be required at a receiver (e.g., RX, STA).

The receiver (RX) processing can be of very low complexity such that there is no threshold adjustment and robust to interference. In some examples, if circular rotations of the Barker sequence and correlators are used at a receiver (RX), then up to 12 additional response types can be added. Note that the 12 additional responses can be added by using a cyclic shift in sequence in some examples. In some examples, a receiver wireless communication device is configured to implement a correlator in order to detect these additional responses.

Note that various types of RU sizes may be allocated to WDEVs for use to make their feedback responses, various pattern(s) of sub-carriers of respective set(s) of sub-carriers within those RU(s), and different parameters may be used for the respective agreed-upon parameters that govern the communications between the wireless communication devices including the feedback response(s) used therein.

In other examples, two different options for sequence in the feedback response may be used: (1) Barker 13 sequence and/or (2) HE-LTF 2× sequence.

Also, two options for multiplexing the MU responses may be used: (1) orthogonal frequency division multiple access (OFDMA)/time division multiple access (TDMA) and/or (2) OFDMA/Spatial Stream (encoded using the P-Matrix).

A WDEV (e.g., WDEV 390, STA) that participates in a HE (High Efficiency) Trigger based PLCP Protocol Data Unit (PPDU) transmission may be implemented to have certain characteristics. Such operation may be based on section 22.3.12.4.6. Examples of such characteristics may include any one or more of: Timing accuracy of ±400 ns (800 ns p-to-p), carrier frequency offset (CFO) error with respect to the corresponding Trigger frame shall not exceed 350 Hz measured as the 10% point of complementary cumulative distribution function (CCDF) of CFO errors at a RX (receive) power of −60 dBm in a primary 20 MHz, absolute transmit (TX) power requirements and the received signal strength indicator (RSSI) measurement accuracy requirements for the two device classes (e.g., Class A: TX power accuracy: +/−3 dB, RSSI measurement accuracy: +/−3 dB, and a dynamic range of 6 dB; and Class B: TX power accuracy: +/−9 dB RSSI accuracy: +/−5 dB, and a dynamic range of 14 dB).

Certain examples of device feedback response from a receiver device (e.g., from a STA, a WDEV, etc.) are described below. A STA feedback response occupies one RU26 in frequency (e.g., where RU26 indicates a resource unit (RU) with 26 total sub-carriers such as with respect to FIG. 7B). Alternatively, a STA feedback response is implemented using sets of 6 OFDMA sub-carriers that are spread across a communication channel of a particular size (e.g., 20 MHz). Symbol time (excluding Cyclic prefix (CP)) is 12.8 micro-seconds (s). Sequence is 13 tones per RU26 interleaved with 13 nulls tones (e.g., this can minimize the impairments from channel response). Sequence power is set to +3 dB to compensate for the 13 nulls tones (e.g., consider the total power for 26 tones RU remain the same). A transmitting device (e.g., AP, AP-operative STA, etc.) can operate to signal to the receiver devices (e.g., from STAs, WDEVs, etc.) the target RSSI level.

Examples of feedback response may be as follows:

1. "YES": a STA send a 13 tones sequence on RU26 at even tone indices (see Table 1) (e.g., note an exception is center RU26 where even on pos. and odd on neg. tone indices).

2. "NO": STA send a 13 tones sequence on RU26 at odd tone indices (see table 1) (e.g., note an exception is center RU26 where odd at pos. and even on neg. tone indices).

Note that the exception described above is because the center RU26 has 14 even and 12 odd tones. For better or best performance, an equal number of non-nulls to nulls tones is used.

TABLE 1

Sequence Tones Indices in 20 MHz

| | YES | NO |
|---|---|---|
| RU26 #1 | −120:2:−96 | −121:2:−95 |
| RU26 #2 | −94:2:−70 | −95:2:−71 |
| RU26 #3 | −68:2:−44 | −67:2:−43 |
| RU26 #4 | −42:2:−18 | −43:2:−17 |
| RU26 #5 | −15:2:−5, 4:2:16 | −16:2:−4, 5:2:15 |
| RU26 #6 | 18:2:42 | 17:2:41 |
| RU26 #7 | 44:2:68 | 43:2:67 |
| RU26 #8 | 70:2:94 | 71:2:95 |
| RU26 #9 | 96:2:120 | 97:2:121 |

Note:
Tone indices for 80 MHz follows the 20 MHz rule with an exception for center RU26.
Tone indices for 40 MHz follows the 20 MHz rule without the center RU26.

Signal Properties

Various signal properties are described below with respect to the operations described herein. Channel estimation is not required at the receiver (e.g., RX, where RX refers to receiver, STA, WDEV, etc.). RX process is trivial, so no threshold adjustment (e.g., compare the sum of power at EVEN with ODD tone locations, compare the sum of energy and/or power at complementary sets of sub-carriers/tones).

Signal is robust to interference and channel response. Detection is unaffected by timing offset. Note that outdoor environment could introduce large timing offset. The timing error delta (Δ) for multiple STAs (e.g., 800 nano-seconds (ns)) with 120 m outdoor, results in 1.6 μs of timing offset. Note that this includes a 360° phase rotation across 8 adjacent sub-carriers based on a flat channel (e.g., flat frequency response).

A response includes an affirmative "YES" or "NO". Note that a "NO response" is not an implied "NO". Note that a "No response" from a STA could mean STA did not received the query, is out of range, or the AP did not decode properly the feedback response.

There may be interference prone environments where queries from AP or responses from STAs are missed. An AP can identify the STAs with "No response" and treat them accordingly. Note also that strong interference does not generate a large number of false "YES" or "NO" feedback responses.

In another example of implementation and operation, the WDEV 310 includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system. The processing circuitry is configured to transmit the first OFDMA packet and/or the second OFDMA packet to WDEV 390 and/or WDEV 391 via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol (s). In a specific example, consider that the data includes data bits $x_0, x_1, \ldots x_{N-Ncp}, \ldots, x_{N-1}$, where the $x_{N-Ncp}$ bit is the first bit of the end portion of the data portion that is to be copied, then the bits $x_{N-Ncp}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include processing circuitry and the communication interface (or alternatively different respective configuration of circuitries, such as SOC 330a and/or processing-memory circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of at least one portion of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of at least one portion of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and/or LTFs can be used to assist a device to identify that a frame is about to start, to synchronize timers, to select an antenna configuration, to set receiver gain, to set up certain of the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of at least one portion of an OFDM/A packet of a third type. In this example 404, the OFDM/A packet includes one or more fields followed by one or more first signal fields (SIG(s) 1) followed by one or more second signal fields (SIG(s) 2) followed by and one or more data field.

FIG. 4E is a diagram illustrating another example 405 of at least one portion of an OFDM/A packet of a fourth type. In this example 405, the OFDM/A packet includes one or more first fields followed by one or more first signal fields (SIG(s) 1) followed by one or more second fields followed by one or more second signal fields (SIG(s) 2) followed by and one or more data field.

FIG. 4F is a diagram illustrating another example 406 of at least one portion of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of at least one portion of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of at least one portion of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of at least one portion of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of at least one portion of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of at least one portion of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG (s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 6D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 5F is a diagram illustrating an example 506 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 551. In another example, OFDM/A frame structure 1 351 is composed of at least one RU 1 551 and at least one RU 2 552. In another example, OFDM/A frame structure 1 351 is composed of at least one RU 1 551, at least one RU 2 552, and at least one RU m 553. Similarly, the OFDM/A frame structure 2 352 up through OFDM/A frame structure n 353 may be composed of any combinations of the various RUs (e.g., including any one or more RU selected from the RU 1 551 through RU m 553).

FIG. 5G is a diagram illustrating an example 507 of various types of different resource units (RUs). In this example 502, RU 1 551 includes A1 total sub-carrier(s), A2 data (D) sub-carrier(s), A3 pilot (P) sub-carrier(s), and A4 unused sub-carrier(s). RU 2 552 includes B1 total sub-carrier(s), B2 D sub-carrier(s), B3 P sub-carrier(s), and B4 unused sub-carrier(s). RU N 553 includes C1 total sub-carrier(s), C2 D sub-carrier(s), C3 P sub-carrier(s), and C4 unused sub-carrier(s).

Considering the various RUs (e.g., across RU 1 551 to RU N 553), the total number of sub-carriers across the RUs increases from RU 1 551 to RU N 553 (e.g., A1<B1<C1). Also, considering the various RUs (e.g., across RU 1 551 to RU N 553), the ratio of pilot sub-carriers to data sub-carriers across the RUs decreases from RU 1 551 to RU N 553 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256

FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., a transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to nine (9) users with 242 sub-carriers—(9 users×26 RUs)=eight (8) unused sub-carriers between the users. In yet another example, four (4) 64 FFT users are multiplexed with 242 sub-carriers—(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

Figures 6A, 6B, 6C, 6D:
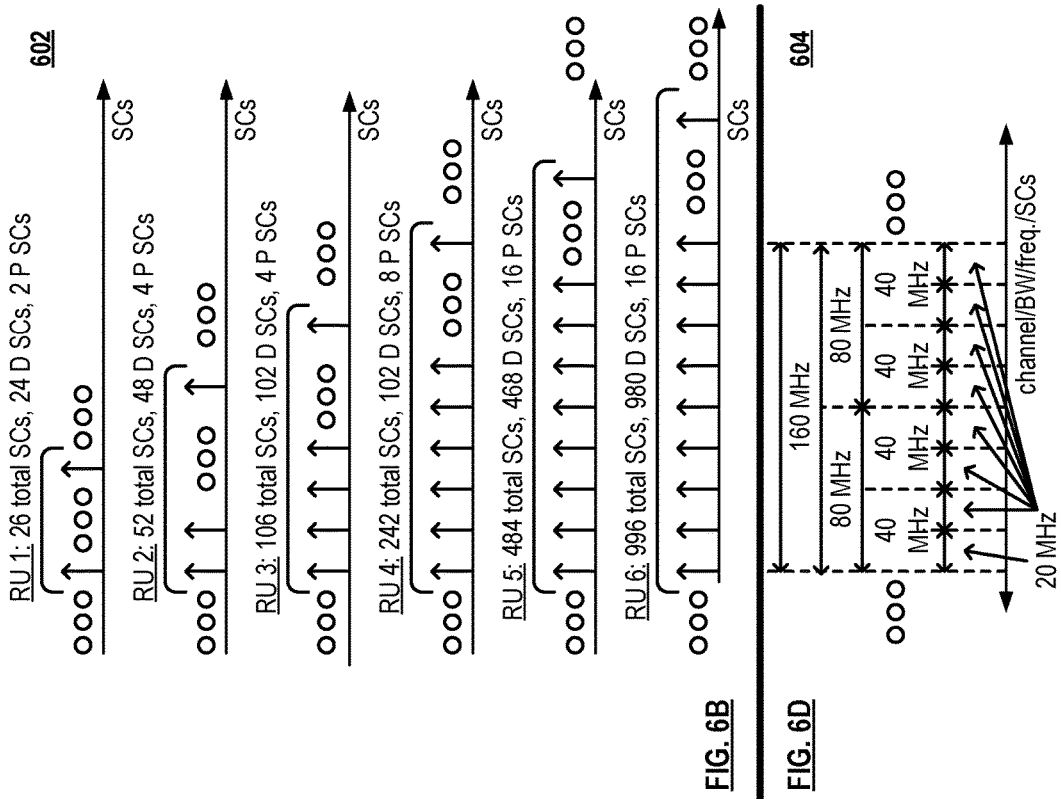

FIG. 6A is a diagram illustrating another example 601 of various types of different RUs. In this example 601, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 601, note that different RUs can include different spacing between the sub-carriers, different sub-carrier densities, implemented within different frequency bands, span different ranges within at least one frequency band, etc.

FIG. 6B is a diagram illustrating another example 602 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 484 total sub-carriers, which is 2× the 242 total sub-carriers of RU 4).

FIG. 6C is a diagram illustrating an example 603 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 6D is a diagram illustrating an example 604 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

FIG. 7A is a diagram illustrating an example 701 of OFDMA/TDMA feedback. Time division multiple access (TDMA) (e.g., such that different symbols may be transmitted at different times, e.g., S#1, S#2, S#3) may be used in combination with orthogonal frequency division multiple access (OFDMA) (e.g., such as described with reference to FIG. 3A-3E). A response from a WDEV may be a combination of OFDMA and TDMA. Feedback from N STA may be performed using a ceiling function, e.g., ceil(N/9) symbols in 20 MHz, ceil(N/36) symbols in 80 MHz.

Each STA may be uniquely assigned particular sets of OFDMA sub-carriers on which to provide responses. For example, note that a wireless communication device (e.g., a STA) is assigned a TONE_SET_INDEX for its feedback response. Such an index (e.g., TONE_SET_INDEX) define the two set of 6 OFDMA sub-carriers that the wireless communication device uses for its response. Such operation avoids collision, and this provides no issues with respect to near/far STA.

FIG. 7A shows an example of feedback from 25 users (e.g., 25 wireless stations (STAs), receivers, etc.). The feedback may be implemented using 3 symbols (e.g., −1, +1, and 0). This example shows receiving "YES" from STAs with IDs: 5, 8, 18, 22 and 25 (hashed), and "NO" from the remaining STA IDs (not hashed/solid).

FIG. 7B is a diagram illustrating an example 702 of a simulation of operation. A detection method, approach, etc. may be implemented as follows:

Detection method (3 outcomes): P1=sum(power in A locations), P0=sum(power in B locations), K=2; % decision scaling factor (P1>K·P0)→YES (P0>K·P1)→NO (not(YES) & not(NO))→No response In some examples, SNR may be calibrated for each 26 tones RU (e.g., per 2 MHz channel or sub-channel).

An alternate detection method, approach, etc. may be implemented as follows (for K=1):

Detection method (2 outcomes): P1=sum(power in A locations), P0=sum(power in B locations), K=1; % Scaling factor for decision (P1≥K·P0)→YES (P0>K·P1)→NO Sequence options: 1 and 2

Examples of different sequence options are described below.

1. Barker 13 sequence, PAPR is 2.84 or 3.90 dB (center RU26):

[+1, +1, +1, +1, +1, −1, −1, +1, +1, −1, +1, −1, +1];

2. HE-LTF 2× sequence (e.g., such as described in the developing IEEE 802.11ax standard), PAPRs is from 3.27 to 4.96 dB (center RU26):

"YES": All RU26 except center RU26, use same indices as HE-LTF 2×. Center RU26, remove tone at −16 and shift negative indices tones by −1 (see Table 1 above).

"NO": All RU26 except center RU26, use odd tone indices by shifting HE-LTF 2× sequence tone indices by +1 or −1. Center RU26, remove tone at +16 and shift positive indices tones by +1 (see Table 1 above).

Note: the probability of errors is same for both sequences. Note also that the Barker sequence has lower PAPR and cyclic shift of sequence (low cross-correlation) could be used to expand the number and type of response.

FIG. 7C is a diagram illustrating another example 703 of OFDMA/TDMA feedback. Time division multiple access (TDMA) (e.g., such that different symbols may be transmitted at different times, e.g., S#1, S#2, S#3) may be used in combination with orthogonal frequency division multiple access (OFDMA) (e.g., such as described with reference to FIG. 3A-3E). Note that MU responses may be based on OFDMA and TDMA.

A response from a WDEV may be a combination of OFMA and TDMA. Feedback from N STA may be performed using a ceiling function, e.g., ceil(N/9) symbols in 20 MHz, ceil(N/36) symbols in 80 MHz.

Each STA may be uniquely assigned one Resource Block (RB) consisting of one RU26 (e.g., energy sent only on the assigned RU26). Such operation avoids collision, and this provides no issues with respect to near/far STA.

This example 703 of feedback from 25 users operates using 3 symbols (e.g., 3 symbols of N bits each). A "YES" from STA ID: 5, 8, 10, 14, 22 and 25. A "NO response" from STA ID: 18. A "NO" from the remaining STA IDs.

Figure 8:
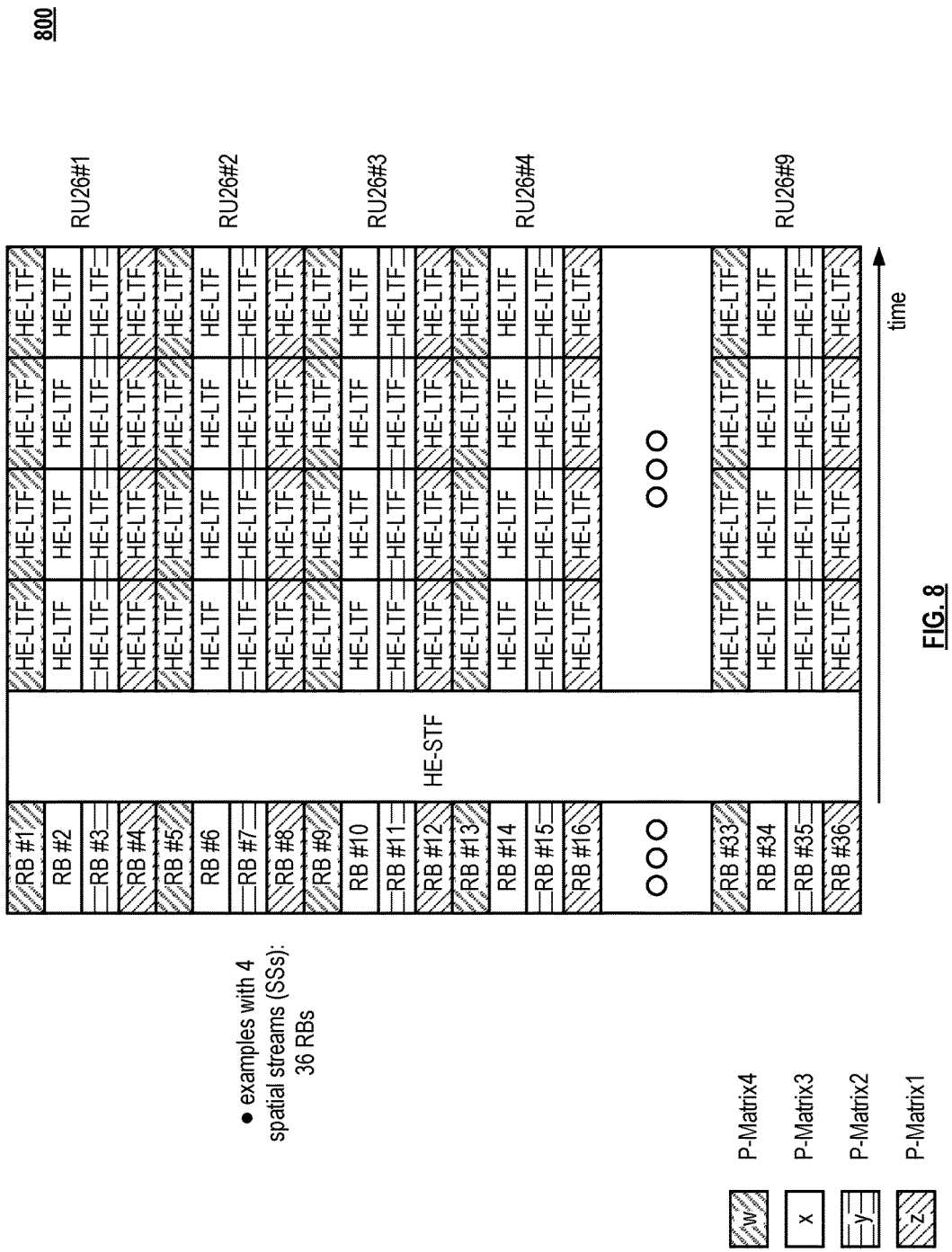
FIG. 8 is a diagram illustrating an example of OFDMA/spatial stream (SS) feedback.

FIG. 8 is a diagram illustrating an example 800 of OFDMA/spatial stream (SS) feedback. This diagram shows an option of multi-user (MU) based on orthogonal frequency division multiple access (OFDMA)/Spatial stream (SS) Feedback. Multiple user (MU) responses are OFDMA and orthogonal by encoding with the P-Matrix in the time direction. Each STA is uniquely assigned one Resource Block (RB) consisting of one orthogonal allocation on one RU26. This operates with no collisions.

This diagram shows an example of feedback for up to 36 users. This uses 4×4 P-Matrix. The sequence is HE-LTF 2× or Barker 13. A "YES" on RB #21: Sequence is sent on sub-carrier/tone indices [18:2:42], repeating for 4 symbols and encoded with P-Matrix row 1. A "NO" on RB #11: Sequence is sent on sub-carrier/tone indices [−67:2:−43], repeating for 4 symbols and encoded with P-Matrix row 3.

Figure 9:
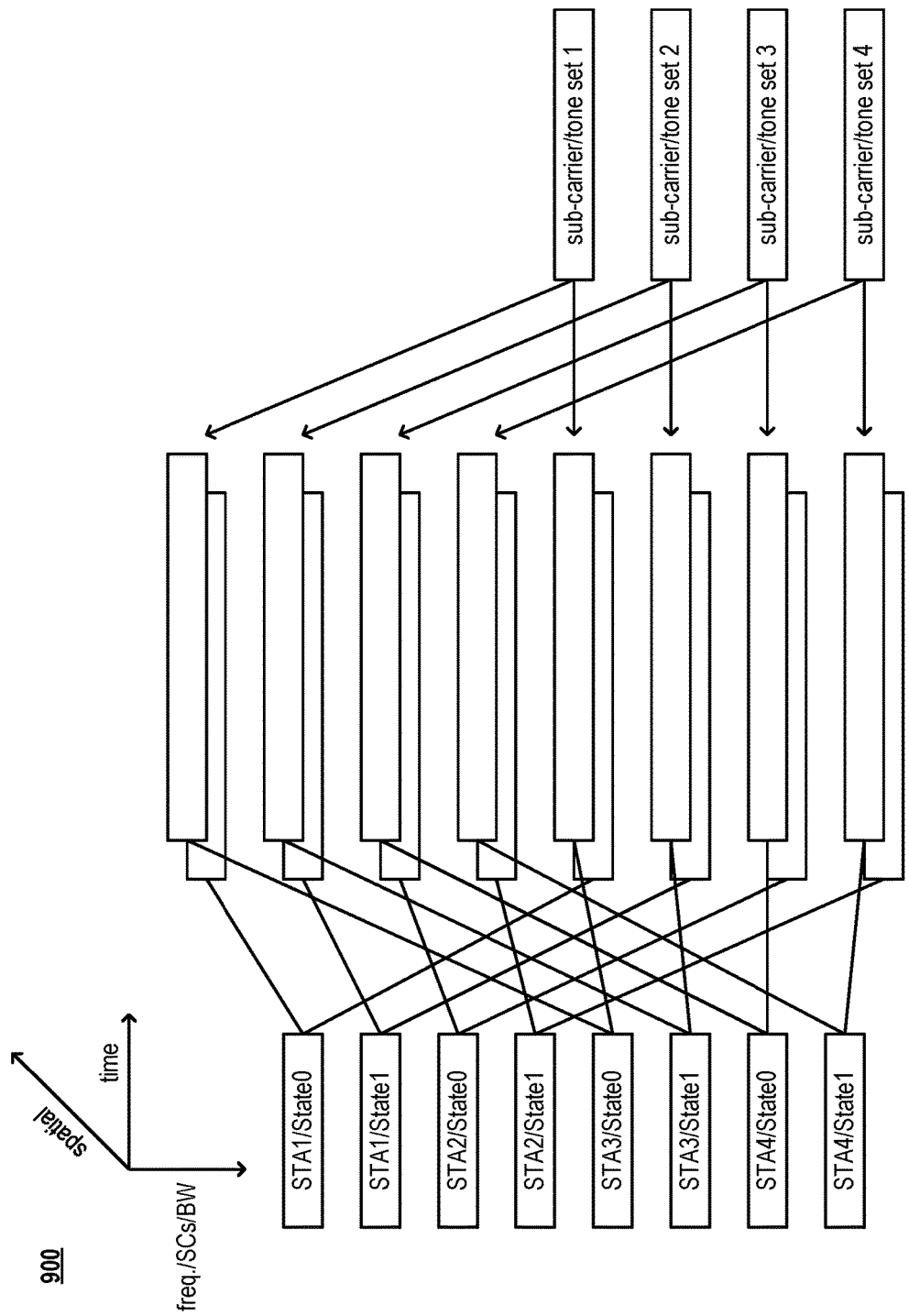
FIG. 9 is a diagram illustrating an example of proposed feedback schemes.

FIG. 9 is a diagram 900 illustrating an example of proposed feedback schemes. Note that the sets of OFDMA sub-carriers (e.g., a first set of 6 OFDMA sub-carriers and a second set of 6 OFDMA sub-carriers) may be located in different portions of the communication channel, OFDMA sub-carriers, bandwidth, etc. In some examples, the sub-carrier/tone set assigned to a first wireless communication device in an RU are interleaved with respect to one or more spatial streams thereby providing spatial diversity and/or one or more OFDM/A symbols thereby providing temporal diversity. In this diagram, 4 different wireless communication devices (e.g., shown as STA1, STA2, STA3, and STA4 in the diagram) and the respective sub-carrier/tone sets are assigned such that two sets of OFDMA sub-carriers are used to transmit 1 bit. For example, if the bit value to be sent is 1 (e.g., $b_x=1$, such as possibly corresponding to a yes answer, a set answer, etc.), then the STA1 is configured to send energy on the first tone set and remain quiet on the second tone set that is assigned to it. Alternatively, if the bit value to be sent is 0 (e.g., $b_x=0$, such as possibly corresponding to a no answer, a not set answer, etc.), then the STA1 is configured to send energy on the second tone set and remain quiet on the first tone set that is assigned to it.

Note that different wireless communication devices/users/STAs may be multiplexed using at least one P-matrix (and/or potentially different sub-carrier/tone sets). In addition, if desired in some embodiments, different respective states of the same wireless communication device/user/STA may be separated with different sub-carrier/tone sets.

FIG. 10 is a diagram 1000 illustrating an example of tones (sub-carriers) user per wireless communication device (e.g., user, STA, etc.) in a 20 MHz bandwidth. Considering one implementation of this diagram, when implementing a 1 bit response: there can be up to 18 STAs send b0=1 or 0. In other examples, when implementing a 2 bit response: there can be up to 9 STAs send column b0=1 or 0 and b1=1 or 0. In even other examples, when implementing 1 bit response with Power Limited Spectral Density: there can be up to 9 STAs send b0=b1=1 or b0=b1=0. The 1 bit response is duplicated on both b1 and b0.

This also diagram shows tone/sub-carriers set indices for 20, 40, 80 and 160 MHz. For example, with respect to 20 MHz tones/sub-carriers used for UL feedback (up to 216 tones): $I_{ULf}$. For 40 MHz tones/sub-carriers used for UL feedback (up to 432 tones): $I_{ULf}$-128, $I_{ULf}$+128. For 80 MHz tones/sub-carriers used for UL feedback (864 tones): $I_{ULf}$-384, $I_{ULf}$-128, $I_{ULf}$+128, $I_{ULf}$+384. For 80+80 MHz, 160 MHz tones/sub-carriers used for UL feedback (up to 1728 tones): same as 80 MHz on lower and upper 80 MHz.

In addition, with respect to OFDMA sub-carrier plans that operate for wireless communication devices (e.g., STAs) that operate based on a 20 MHz communication channel and other wireless communication devices (e.g., STAs) that operate based on a 40 and/or 80 MHz communication channel, the sub-carriers/tones may be aligned centrally with respect to the various OFDMA sub-carrier plans. For example, the sub-carriers/tones assigned from one or more RUs within the respective sub-carrier plans may be aligned (e.g., such as using sub-carriers/tones at [−116:−2, 2:116]) such that the sub-carriers/tones are common to the 20 MHz OFDMA sub-carrier plan that is tailored for 20 MHz only operative wireless communication devices (e.g., STAs), as well as with respect to the 40 and 80 MHz OFDMA sub-carrier plans.

This disclosure presents, among other things, various aspects, embodiments, and/or examples that operate by selecting tones (sub-carriers) that are common to 20 MHz only operative wireless communication devices (e.g., STA(s)) and 40 MHz or 80 MHz operative wireless communication devices (e.g., AP(s) and/or STA(s)). This change allows the 20 MHz only operative wireless communication devices (e.g., STA(s)) to send their Uplink (UL) response at the same time with 40 MHz and 80 MHz operative wireless communication devices (e.g., AP(s) and/or STA(s)).

For example, considering an OFDMA sub-carriers plan (e.g., such as in accordance with the developing IEEE 802.11ax), the tones (sub-carriers) indices of four 20 MHz only STA on the tone (sub-carrier) grid for 40/80 MHz AP. Because there are extra tones (sub-carriers) within a given RU, but not enough to allow the addition of another user, some tones (sub-carriers) near DC and at edges of band are discarded or not used to minimize degradation from DC and filtering.

For example, in this diagram, there are two set of 6 tones (sub-carriers) used for 1 bit and four set of 6 tones (sub-carriers) for 2 bits. The table is per 20 MHz. For 40 MHz, the number of users double, the indices are: I−128 and I+128. For 80 MHz, the number of users quadruple, the indices are: I−384, I+128, I+128 and I+384.

The "YES" b0=1 and the "NO" b0=0 tones (sub-carriers) are immediately adjacent. This improves the robustness in presence of interference. Interferences are likely to add power to adjacent subcarriers, biasing the receiver decision toward a "No Response". A "No Response" bias is a better outcome than a "YES" or "NO" bias.

Note that may be some regions or locations where the Power Spectral Density of signal is limited, it is calculated by 1 MHz segments. The new proposal spread the UL response 6 or 12 tones (sub-carriers) over 20 MHz instead of 2 MHz (a single RU-26). This measure allows the STA to send the response with more power. To avoid triggering a false Radar detection in the DFS band, the 6 tones (sub-carriers) are spread over 20 MHz instead of 2 MHz. Note that for power spectral limited transmission, a wireless communication device (e.g., STA) may be implemented to use 2 bits to send a 1 bit response. In such cases, the wireless communication device (e.g., STA) can use b1b0=11 or 00.

Figure 11A:
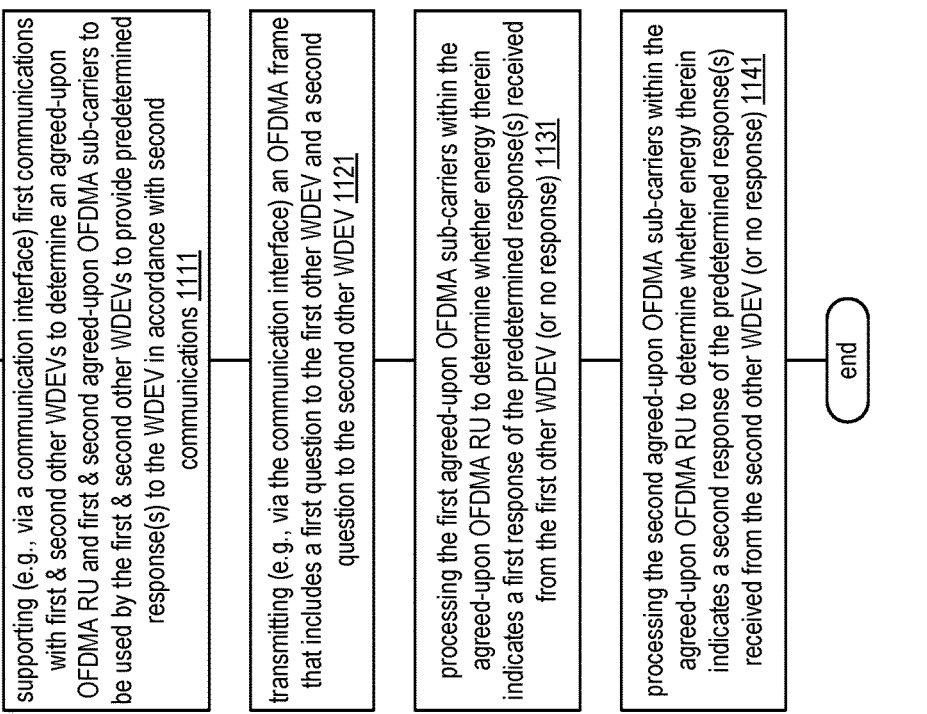
FIG. 11A is a diagram illustrating an embodiment of a method for execution by at least one wireless communication device.

FIG. 11A is a diagram illustrating an embodiment of a method 1100 for execution by at least one wireless communication device. The method 1101 operates in step 1110 by supporting (e.g., via a communication interface of a wireless communication device) first communications with another wireless communication device to determine an agreed-upon orthogonal frequency division multiple access (OFDMA) resource unit (RU) of a plurality of OFDMA RUs and a plurality of agreed-upon OFDMA sub-carriers within the OFDMA RU to be used by the another wireless communication device to provide one or more predetermined responses to the wireless communication device in accordance with second communications.

The method 1101 then operates in accordance with the second communications. For example, the method 1101 continues in step 1120 by transmitting (e.g., via the communication interface) a question to the wireless communication device wireless communication device. The method 1101 then operates in step 1130 by processing the plurality of agreed-upon OFDMA sub-carriers within the OFDMA RU to determine whether energy therein indicates a response of the one or more predetermined responses to the question being received from the other wireless communication device.

Figure 11B:
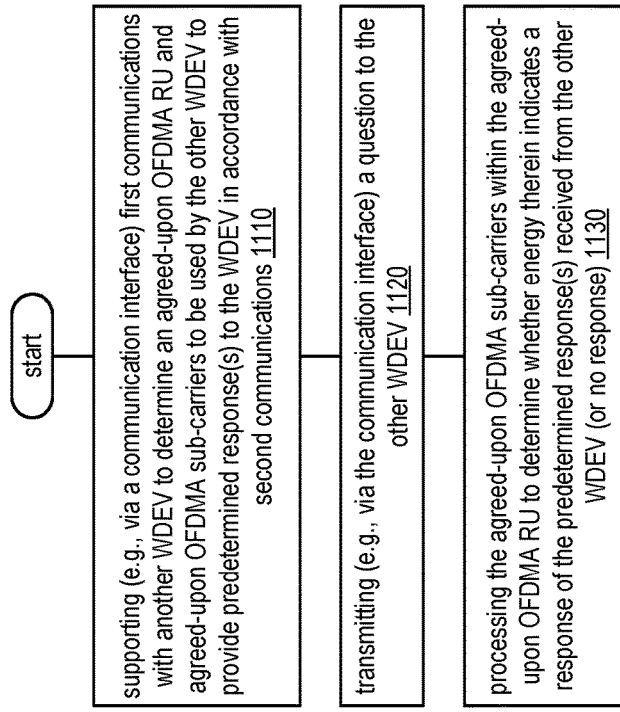
FIG. 11B is a diagram illustrating another embodiment of a method for execution by at least one wireless communication device.

FIG. 11B is a diagram illustrating another embodiment of a method 1102 for execution by at least one wireless communication device. The method 1102 operates in step 1111 by supporting (e.g., via a communication interface of a wireless communication device) first communications with a first other wireless communication device and a second other wireless communication device to determine an agreed-upon orthogonal frequency division multiple access (OFDMA) resource unit (RU) of a plurality of OFDMA RUs and a first plurality of agreed-upon OFDMA sub-carriers within the OFDMA RU to be used by the first other wireless communication device to provide one or more predetermined responses to the wireless communication device and a second plurality of agreed-upon OFDMA sub-carriers within the OFDMA RU to be used by the second other wireless communication device to provide the one or more predetermined responses to the wireless communication device in accordance with second communications.

The method 1102 then operates in accordance with the second communications. The method 1102 continues in step 1121 by transmitting (e.g., via the communication interface) an OFDMA frame that includes a first question to the first other wireless communication device and a second question to the second other wireless communication device.

The method 1102 then operates in step 1131 by processing the first plurality of agreed-upon OFDMA sub-carriers within the OFDMA RU to determine whether energy therein indicates a first response of the one or more predetermined responses to the first question from the first other wireless communication device. The method 1102 then continues in step 1141 by processing the second plurality of agreed-upon OFDMA sub-carriers within the OFDMA RU to determine whether energy therein indicates a second response of the one or more predetermined responses to the second question from the second other wireless communication device.

This disclosure presents, among other things, various examples where feedback includes 3 states: "YES", "NO," or "No response". In some examples, this is done by using 2 sets of 6 OFDMA sub-carriers/tones each for 2 other wireless communication devices in a 26 tones RU (or vice versa). Different sets of sub-carriers may be assigned within the RU. Short feedback can used for other purpose than just a "YES" or "NO" response. In some examples, feedback could be an answer for a question having 2 (or more) corresponding possible answers.

Examples of such questions may include: (1) Does the wireless communication device have traffic in your queue for >20 mS, >100 mS? (3) How many bytes are buffered in the wireless communication device for transmission >1000 bytes, >5000 bytes? And (3) How many packets are buffered in the wireless communication device for transmission >5 packets, >15 packets?

In some examples, this disclosure also proposes to scale one measurement of an answer/feedback response (e.g., based on a scaling factor) and compare it to the other measurement of an answer/feedback response to declare is one state is true or not (e.g., compare the sum of energy and/or power at complementary sets of sub-carriers/tones). This can eliminate any need of tracking the channel noise, measured at one or more different times, to adjust a threshold. This novel scheme is very robust to change in the channel conditions and interference.

Also, note that one RU26 (e.g., a resource unit (RU) with 26 sub-carriers/tones) could be subdivided in frequency to multiplex multiple wireless stations (STAs). This frequency division multiple access (FDMA) technique allow more STA per symbol in the feedback response.

In some specific examples, this disclosure presents that various examples include 4 sets of 6 sub-carriers/tones per RU26 (e.g., using 24 total out of 26 sub-carriers/tones). For example, the two sets of 6 sub-carriers/tones are assigned to a first WDEV/STA #1 and the second set is assigned to a second WDEV/STA #2. With this technique, this disclosure proposes that a wireless communication device can signal a feedback response with an affirmative "YES" and "NO". A determination of no response may be determined based on a situation when neither an affirmative "YES" nor an affirmative "NO" may be determined.

For example, considering a OFDM sub-carrier plan that includes 9 RUs of 26 sub-carriers/tones in 20 MHz (e.g., such as with respect to the developing IEEE 802.11ax), each 26 tones RU are sub-divided into four sets of 6 sub-carriers/tones. In some examples, 2 sets of 6 sub-carriers/tones each may be used and assigned to a given wireless communication device/STA. In a specific implementation, 6 sub-carrier/tone sets are chosen to pack 2 users per 26 sub-carrier/tone RU. Also, 6 sub-carrier/tone sets have enough frequency diversity per 26 sub-carrier/tone RU. One bit or two bits (or even more bits) are assigned to one user feedback response.

In a specific example, two sets of 6 sub-carrier/tone are used to transmit 1 bit responses (e.g., yes or no, set or not set, etc.). Note that channel estimation is not needed for detection. Also, the participating wireless communication devices (e.g., an AP and one or more STAs) operate to support prior communications (e.g., frame exchanges) to have a prior agreement on which specific one or more RUs and which specific sub-carrier/tone sets within the one or more RUs are to be used in accordance with such subsequent communications such as transmitting question(s) and receiving response(s). Note also that one or more P-matrices spreading may also be used for given response(s).

It is noted that while certain examples provided herein use the example of a certain number of sub-carriers within a given resource unit (RU) and/or a certain subset of sub-carriers within an RU on which energy is included to effectuate a given response (e.g., a first response such as a yes response when energy is included on a first subset of sub-carriers within the RU(s) or alternatively a second response such as a no response when energy is included on a second subset of sub-carriers within the RU(s)). Specifically, some examples may use 6 sub-carriers sets, etc. In general, the various aspects, embodiments, and/or examples of the invention as presented herein may be applied and used in specific examples of any desired size.

In general, a communication channel may include any desired communication channel or sub-channel of a communication channel bandwidth size, desired number of RUs or any desired size, and any desired number of sub-carriers may be included within those one or more RUs (and different numbers of sub-carriers may be included in different RUs), and any desired first one or more sub-carriers may be used to effectuate a first response (e.g., a yes) and any desired second one or more sub-carriers may be used to effectuate a second response (e.g., a no), any desired P-matrix of any size and dimension may be used (or not used), any desired sequence of any desired type (e.g., such as a Barker sequence, or not used), any combination of used and unused sub-carriers within one or more RU(s), any combination of two or more RUs, any number of symbols, etc. and/or any other variations of the specific numbers and values of specific parameters as are used herein.

For example, while one specific example includes 4 sets of 6 sub-carriers each within a RU such as an RU with 26 sub-carriers. Note that the respective sets of 6 sub-carriers may be spread across a 20 MHz communication channel such that the respective sets of 6 sub-carriers are not composed respective or entirely of adjacently located or contiguous sub-carriers (e.g., having some similarities to the principles shown with respect to FIG. 3C with respect to different respective sets of sub-carriers assigned to different respective users). Also, within some example that operate based on different respective communication channels and/or sub-communication channels (e.g., such as 20 MHz, 40 MHz, 80 MHz, etc.), with respect to the sub-carriers located therein, some examples employ only sub-carriers that are common to the respective different respective communication channels and/or sub-communication channels. Some other examples used adjacent sub-carriers sets for different respective responses (e.g., a first sub-carrier set for a first response such as a yes response, and a second first sub-carrier set for a second response such as a no response). Also, some examples may operate not to use certain sub-carriers (e.g., unused sub-carriers) that are at specific locations (e.g., such as the −2 and +2 sub-carrier indices within each respective 20 MHz portion).

Another specific example includes 2 sets of 6 sub-carriers each within an RU such as an RU with 26 sub-carriers. In general, any alternative combination of sub-carriers within such an RU or 26 sub-carriers may be used without departing from the scope and spirit of the invention. Also, any one or more unused sub-carriers may be included in any specific example of various combinations or sets of sub-carriers within any one or more RUs. As some other examples considering an RU with 26 sub-carriers, there could be 8 sets of 3 sub-carriers each, 7 sets of 3 sub-carriers each, 6 sets of 4 sub-carriers each, 5 sets of 5 sub-carriers, 4 sets of 6 sub-carriers, 3 sets of 8 sub-carriers, 2 sets of 13 sub-carriers each, 2 sets of 12 sub-carriers each, etc. In general, any specific number of sets of sub-carriers and any desired specific numbers of sub-carriers maybe included in each respective set of sub-carriers. Note also that such principles may be extended to any other sized RU with any other number of sub-carriers.

It is noted that the various operations and functions described within various methods herein may be performed within a wireless communication device (e.g., such as by the processing circuitry 330, communication interface 320, and memory 340 or other configuration of circuitries such as SOC 330a and/or processing-memory circuitry 330b such as described with reference to FIG. 2B) and/or other components therein. Generally, a communication interface and processing circuitry (or alternatively processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by processing circuitry in a first device and another processing circuitry within a second device. In other embodiments, such processing is performed wholly by processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   processing circuitry that is coupled to the communication interface, wherein at least one of the communication interface or the processing circuitry configured to:
   support first communications with another wireless communication device to determine an agreed-upon orthogonal frequency division multiple access (OFDMA) resource unit (RU) of a plurality of OFDMA RUs and a plurality of agreed-upon OFDMA sub-carriers within the OFDMA RU to be used by the another wireless communication device to provide one or more predetermined responses to the wireless communication device in accordance with second communications; and
   in accordance with the second communications, transmit a question to the another wireless communication device and process the plurality of agreed-upon OFDMA sub-carriers within the OFDMA RU to determine whether energy therein indicates a response of the one or more predetermined responses to the question being received from the another wireless communication device; and
   wherein the at least one of the communication interface or the processing circuitry is further configured to:
   support third communications with a first other wireless communication device and a second other wireless communication device to determine another agreed-upon OFDMA RU of the plurality of OFDMA RUs and a first other plurality of agreed-upon OFDMA sub-carriers within the another OFDMA RU to be used by the first other wireless communication device to provide the one or more predetermined responses to the wireless communication device in accordance with fourth communications and a second other plurality of agreed-upon OFDMA sub-carriers within the another OFDMA RU to be used by the second other wireless communication device to provide the one or more predetermined responses to the wireless communication device in accordance with the fourth communications; and
   in accordance with the fourth communications:
   transmit an OFDMA frame that includes a first other question to the first other wireless communication device and a second other question to the second other wireless communication device;
   process the first other plurality of agreed-upon OFDMA sub-carriers within the another OFDMA RU to determine whether energy therein indicates a first other response of the one or more predetermined responses to the first other question from the first other wireless communication device; and
   process the second other plurality of agreed-upon OFDMA sub-carriers within the another OFDMA RU to determine whether energy therein indicates a second other response of the one or more predetermined responses to the second other question from the second other wireless communication device.

2. The wireless communication device of claim 1, wherein:
   the OFDMA RU of the plurality of OFDMA RUs is based on a 20 MHz communication channel;
   the plurality of agreed-upon OFDMA sub-carriers within the OFDMA RU, based on the 20 MHz communication channel, includes a first set of 6 OFDMA sub-carriers and a second set of 6 OFDMA sub-carriers;

first energy within the first set of 6 OFDMA sub-carriers is determined to be greater than second energy within the second set of 6 OFDMA sub-carriers based on a scaling factor corresponding to a first predetermined response of the one or more predetermined responses to the question being received from the another wireless communication device; and the second energy within the second set of 6 OFDMA sub-carriers is determined to be greater than the first energy within the first set of 6 OFDMA sub-carriers based on the scaling factor corresponding to a second predetermined response of the one or more predetermined responses to the question being received from the another wireless communication device.

3. The wireless communication device of claim 2, wherein:

the first energy within the first set of 6 OFDMA sub-carriers is not determined to be greater than the second energy within the second set of 6 OFDMA sub-carriers based on the scaling factor and the second energy within the second set of 6 OFDMA sub-carriers is not determined to be greater than the first energy within the first set of 6 OFDMA sub-carriers based on the scaling factor corresponding to no response to the question being received from the another wireless communication device.

4. The wireless communication device of claim 1, wherein:

the OFDMA RU of the plurality of OFDMA RUs is based on a 20 MHz communication channel;

the plurality of agreed-upon OFDMA sub-carriers within the OFDMA RU, based on the 20 MHz communication channel, includes a first set of 6 OFDMA sub-carriers and a second set of 6 OFDMA sub-carriers;

first energy within fewer than all of the first set of 6 OFDMA sub-carriers is determined to be greater than second energy within fewer than all of the second set of 6 OFDMA sub-carriers based on a scaling factor corresponding to a first predetermined response of the one or more predetermined responses to the question being received from the another wireless communication device; and the second energy within the fewer than all of the second set of 6 OFDMA sub-carriers is determined to be greater than the first energy within the fewer than all of the first set of 6 OFDMA sub-carriers based on the scaling factor corresponding to a second predetermined response of the one or more predetermined responses to the question being received from the another wireless communication device.

5. The wireless communication device of claim 4, wherein:

the first predetermined response of the one or more predetermined responses includes a first 1-bit predetermined response; and the second predetermined response of the one or more predetermined responses includes a second 1-bit predetermined response.

6. The wireless communication device of claim 1 further comprising:

an access point (AP), wherein the another wireless communication device includes a wireless station (STA).

7. The wireless communication device of claim 1 further comprising:

a wireless station (STA), wherein the another wireless communication device includes at least one of an access point (AP) or another STA.

8. A wireless communication device comprising:

a communication interface; and processing circuitry that is coupled to the communication interface, wherein at least one of the communication interface or the processing circuitry configured to:

support first communications with a first other wireless communication device and a second other wireless communication device to determine an agreed-upon orthogonal frequency division multiple access (OFDMA) resource unit (RU) of a plurality of OFDMA RUs and a first plurality of agreed-upon OFDMA sub-carriers within the OFDMA RU to be used by the first other wireless communication device to provide one or more predetermined responses to the wireless communication device and a second plurality of agreed-upon OFDMA sub-carriers within the OFDMA RU to be used by the second other wireless communication device to provide the one or more predetermined responses to the wireless communication device in accordance with second communications; and in accordance with the second communications:

transmit an OFDMA frame that includes a first question to the first other wireless communication device and a second question to the second other wireless communication device;

process the first plurality of agreed-upon OFDMA sub-carriers within the OFDMA RU to determine whether energy therein indicates a first response of the one or more predetermined responses to the first question from the first other wireless communication device; and process the second plurality of agreed-upon OFDMA sub-carriers within the OFDMA RU to determine whether energy therein indicates a second response of the one or more predetermined responses to the second question from the second other wireless communication device the OFDMA RU of the plurality of OFDMA RUs is based on a 20 MHz communication channel; and wherein the first plurality of agreed-upon OFDMA sub-carriers within the OFDMA RU, based on the 20 MHz communication channel, includes a first set of 6 OFDMA sub-carriers and a second set of 6 OFDMA sub-carriers;

and wherein at least one of the communication interface or the processing circuitry is further configured to:

determine if a first energy within the first set of 6 OFDMA sub-carriers is greater than second energy within the second set of 6 OFDMA sub-carriers based on a scaling factor corresponding to a first predetermined response of the one or more predetermined responses to the first question being received from the first other wireless communication device;

determine if the second energy within the second set of 6 OFDMA sub-carriers is greater than the first energy within the first set of 6 OFDMA sub-carriers based on the scaling factor corresponding to a second predetermined response of the one or more predetermined responses to the first question being received from the first other wireless communication device; and the second plurality of agreed-upon OFDMA sub-carriers within the OFDMA RU, based on the 20 MHz communication channel, includes a third set of 6 OFDMA sub-carriers and a fourth set of 6 OFDMA sub-carriers; and determine if a third energy within the third set of 6 OFDMA sub-carriers is greater than fourth energy within the fourth set of 6 OFDMA sub-carriers based on the scaling factor corresponding to a third predetermined response of the one or more predetermined responses to the second question being received from the second other wireless communication device; and
determine if the fourth energy within the fourth set of 6 OFDMA sub-carriers is greater than the third energy within the third set of 6 OFDMA sub-carriers based on the scaling factor corresponding to a fourth predetermined response of the one or more predetermined responses to the second question being received from the second other wireless communication device.

9. The wireless communication device of claim 8, wherein the at least one of the communication interface or the processing circuitry is further configured to:
determine that the first energy within the first set of 6 OFDMA sub-carriers is not greater than the second energy within the second set of 6 OFDMA sub-carriers based on the scaling factor and the second energy within the second set of 6 OFDMA sub-carriers is not greater than the first energy within the first set of 6 OFDMA sub-carriers based on the scaling factor corresponding to no response to the first question being received from the first other wireless communication device; and
determine that the third energy within the third set of 6 OFDMA sub-carriers is not greater than the fourth energy within the fourth set of 6 OFDMA sub-carriers based on the scaling factor and the fourth energy within the fourth set of 6 OFDMA sub-carriers is not greater than the third energy within the third set of 6 OFDMA sub-carriers based on the scaling factor corresponding to no response to the second question being received from the second other wireless communication device.

10. The wireless communication device of claim 8, wherein:
the OFDMA RU of the plurality of OFDMA RUs is based on a 20 MHz communication channel;
the first plurality of agreed-upon OFDMA sub-carriers within the OFDMA RU, based on the 20 MHz communication channel, includes a first set of 6 OFDMA sub-carriers and a second set of 6 OFDMA sub-carriers; and
wherein the at least one of the communication interface or the processing circuitry is further configured to:
determine that first energy within fewer than all of the first set of 6 OFDMA sub-carriers is greater than second energy within fewer than all of the second set of 6 OFDMA sub-carriers based on a scaling factor corresponding to a first 1-bit predetermined response of the one or more predetermined responses to the first question being received from the first other wireless communication device; and
determine that the second energy within the fewer than all of the second set of 6 OFDMA sub-carriers is greater than the first energy within the fewer than all of the first set of 6OFDMA sub-carriers based on the scaling factor corresponding to a second 1-bit predetermined response of the one or more predetermined responses to the first question being received from the first other wireless communication device.

11. The wireless communication device of claim 8 further comprising:
an access point (AP), wherein at least one of the first other wireless communication device or the second other wireless communication device includes a wireless station (STA).

12. A method for execution by a wireless communication device, the method comprising:
supporting, via a communication interface of the wireless communication device, first communications with another wireless communication device to determine an agreed-upon orthogonal frequency division multiple access (OFDMA) resource unit (RU) of a plurality of OFDMA RUs and a plurality of agreed-upon OFDMA sub-carriers within the OFDMA RU to be used by the another wireless communication device to provide one or more predetermined responses to the wireless communication device in accordance with second communications;
in accordance with the second communications:
transmitting, via the communication interface, a question to the wireless communication device wireless communication device; and
processing the plurality of agreed-upon OFDMA sub-carriers within the OFDMA RU to determine whether energy therein indicates a response of the one or more predetermined responses to the question being received from the another wireless communication device; and
supporting, via the communication interface, third communications with a first other wireless communication device and a second other wireless communication device to determine another agreed-upon OFDMA RU of the plurality of OFDMA RUs and a first other plurality of agreed-upon OFDMA sub-carriers within the another OFDMA RU to be used by the first other wireless communication device to provide the one or more predetermined responses to the wireless communication device in accordance with fourth communications and a second other plurality of agreed-upon OFDMA sub-carriers within the another OFDMA RU to be used by the second other wireless communication device to provide the one or more predetermined responses to the wireless communication device in accordance with the fourth communications; and
in accordance with the fourth communications:
transmitting, via the communication interface, an OFDMA frame that includes a first other question to the first other wireless communication device and a second other question to the second other wireless communication device;
processing the first other plurality of agreed-upon OFDMA sub-carriers within the another OFDMA RU to determine whether energy therein indicates a first other response of the one or more predetermined responses to the first other question from the first other wireless communication device; and
processing the second other plurality of agreed-upon OFDMA sub-carriers within the another OFDMA RU to determine whether energy therein indicates a second other response of the one or more predetermined responses to the second other question from the second other wireless communication device.

13. The method of claim 12, wherein:
the OFDMA RU of the plurality of OFDMA RUs is based on a 20 MHz communication channel;
the plurality of agreed-upon OFDMA sub-carriers within the OFDMA RU, based on the 20 MHz communication channel, includes a first set of 6 OFDMA sub-carriers and a second set of 6 OFDMA sub-carriers;
first energy within the first set of 6 OFDMA sub-carriers is determined to be greater than second energy within the second set of 6 OFDMA sub-carriers based on a scaling factor corresponding to a first predetermined response of the one or more predetermined responses to the question being received from the another wireless communication device; and the second energy within the second set of 6 OFDMA sub-carriers is determined to be greater than the first energy within the first set of 6 OFDMA sub-carriers based on the scaling factor corresponding to a second predetermined response of the one or more predetermined responses to the question being received from the another wireless communication device.

14. The method of claim 13, wherein:

the first energy within the first set of 6 OFDMA sub-carriers is determined not to be greater than the second energy within the second set of 6 OFDMA sub-carriers based on the scaling factor and the second energy within the second set of 6 OFDMA sub-carriers is determined not to be greater than the first energy within the first set of 6 OFDMA sub-carriers based on the scaling factor corresponding to no response to the question being received from the another wireless communication device.

15. The method of claim 12, wherein:

the OFDMA RU of the plurality of OFDMA RUs is based on a 20 MHz communication channel;

the plurality of agreed-upon OFDMA sub-carriers within the OFDMA RU, based on the 20 MHz communication channel, includes a first set of 6 OFDMA sub-carriers and a second set of 6 OFDMA sub-carriers;

first energy within fewer than all of the first set of 6 OFDMA sub-carriers is determined to be greater than second energy within fewer than all of the second set of 6 OFDMA sub-carriers based on a scaling factor corresponding to a first predetermined response of the one or more predetermined responses to the question being received from the another wireless communication device; and the second energy within the fewer than all of the second set of 6 OFDMA sub-carriers is determined to be greater than the first energy within the fewer than all of the first set of 6 OFDMA sub-carriers based on the scaling factor corresponding to a second predetermined response of the one or more predetermined responses to the question being received from the another wireless communication device.

16. The method of claim 15, wherein:

the first predetermined response of the one or more predetermined responses includes a first 1-bit predetermined response; and the second predetermined response of the one or more predetermined responses includes a second 1-bit predetermined response.

17. The method of claim 12, wherein the wireless communication device includes an access point (AP), and the another wireless communication device includes a wireless station (STA).

* * * * *